(12) United States Patent
Hawkes

(10) Patent No.: US 8,474,856 B2
(45) Date of Patent: Jul. 2, 2013

(54) WHEELABLE LOADBEARING AND LEVERAGING FRAME APPARATUS

(76) Inventor: Edward Gerry Hawkes, Woodstock, VT (US)

( * ) Notice: Subject to any disclaimer, the term of this patent is extended or adjusted under 35 U.S.C. 154(b) by 159 days.

(21) Appl. No.: 13/134,741

(22) Filed: Jun. 16, 2011

(65) Prior Publication Data

US 2012/0319381 A1 Dec. 20, 2012

(51) Int. Cl.
*B62B 1/00* (2006.01)

(52) U.S. Cl.
USPC ................ 280/653; 280/47.18; 280/47.31

(58) Field of Classification Search
USPC ............. 280/47.18, 653, 47.31, 7.12, 47.24, 280/47.2
See application file for complete search history.

(56) References Cited

U.S. PATENT DOCUMENTS

| 2,672,348 | A | * | 3/1954 | Scott | 280/653 |
| 3,045,847 | A | * | 7/1962 | Fisher | 280/47.31 |
| 4,190,260 | A | * | 2/1980 | Pearce | 280/47.31 |
| 5,242,177 | A | * | 9/1993 | Morris | 280/47.31 |
| 5,607,174 | A | * | 3/1997 | Ambrogio | 280/653 |
| 5,810,375 | A | * | 9/1998 | Hoffarth et al. | 280/47.31 |
| 6,161,850 | A | * | 12/2000 | James et al. | 280/47.18 |
| 6,474,007 | B1 | * | 11/2002 | Sueshige et al. | 280/653 |
| 7,316,413 | B2 | * | 1/2008 | Beaudoin | 280/653 |
| 7,866,686 | B2 | * | 1/2011 | Conaway et al. | 280/653 |

* cited by examiner

*Primary Examiner* — Hau Phan
(74) *Attorney, Agent, or Firm* — John J. Welch, Jr., Esq.

(57) ABSTRACT

A wheelable loadbearing and leveraging frame apparatus amenable to receipt of attachments and consisting of first and second elongated members conjoined by way of anterior and medial cross members each with a plurality of horizontally inclined through holes therein and a posterior cross member with a plurality of vertically inclined through holes therein, and with each elongated member having a pair of horizontally inclined transverse through holes located therein and a plurality of vertically inclined through holes located therein.

5 Claims, 25 Drawing Sheets

WHEELABLE LOADBEARING AND LEVERAGING FRAME APPARATUS

PRIOR OR PARENT APPLICATIONS

There are no prior or parent applications regarding the instant invention excepting perhaps as respects a Provisional Patent Application dated Feb. 17, 2010 bearing application No. 61/338,298 such as could be viewed as referencing certain features resembling those of the instant invention.

FEDERALLY SPONSORED RESEARCH AND DEVELOPMENT

There is no federally sponsored research and/or development regarding the instant invention.

BACKGROUND OF THE INVENTION

1. Field of the Invention

The invention relates to that coterie of devices suitable for facilitating manual lifting, leveraging and transportation of notably massive loads of earthen and also, for example, building materials or debris.

2. Related Art

The art disclosed in the herewith submitted Information Disclosure Statement somewhat relates to but does not anticipate the instant invention.

A SUMMARY OF THE INVENTION

1. A Brief Description of the Invention

The invention is; for an elemental embodiment thereof; first and foremost, a wheelable frame apparatus. The apparatus is made up of a pair of equivalently shaped and sized elongated members. Each such member is sturdily constructed and typically hollow throughout. Each is bent at a first bias near the anterior end of each and bent at an equal and opposite bias near the posterior end of each. There is an anterior cross member serving to conjoin each elongated member to one another at the anterior ends of each. There is a medial cross member serving to further conjoin the elongated members together. Finally, there is a posterior cross member that also serves to conjoin the elongated members to one another. The medial and posterior cross members are typically right angularly shaped, though; cylindrical tubing could also be utilized in such regards The elongated members each have a plurality of paired vertically inclined through holes strategically positioned for the purpose of receiving detent pins or nut and bolt complexes as means of affixing various attachments to the frame unit with such attachments also being characterized, as well, by the presence of appropriately positioned vertically inclined or in certain instances, horizontally inclined through holes. A posterior socket in each elongated member characterized by the presence of paired vertically inclined through holes is amenable to receipt of a cylindrically formed or perhaps rectangularly formed anterior end of an S-shaped handlebar also equipped with a pair of vertically inclined through holes. Alternatively, each posterior socket is also amenable to receipt of a cylindrically or rectangularly formed anterior end of a Y-shaped posterior pulling unit with each of the two anterior ends of the pulling unit also having a pair of vertically inclined holes. Each elongated member also has an anterior socket characterized by the presence of a pair of vertically inclined through holes with each such socket being amenable to receipt of a cylindrically formed extender unit characterized by the presence of an anteriorly positioned and a posteriorly positioned pair of vertically aligned through holes. Each anterior socket is also amenable to receipt of a cylindrically formed posterior end of a two-ended prybar with each posterior end thereof also being characterized by the presence of a pair of vertically aligned through holes. Each elongated member also has a pair of horizontally inclined transverse holes. The pair of transverse holes in each elongated member serves to hold a transverse axle at respective ends thereof, which said axle is amenable to receipt of wheeling held in place by exteriorly positioned lynch pins insertable through, through holes at either end of the axle unit. The frame apparatus equipped with a transverse axle affixed thereto with lynch pins is a more elaborate embodiment of the invention. A plurality of horizontally inclined holes in the anterior cross member and medial cross member serve, in conjunction with horizontally inclined through holes in a wheel shield, held via, for example detent pins, to hold a wheel shield unit to the frame unit above wheeling attached as noted above to the transverse axle unit. A rectangularly shaped flooring unit with a through hole in each corner thereof is anteriorly affixable to each elongated cross member via detent pins inserted through each of two anterior corner holes thereof and through vertically inclined paired through holes in each elongated member respectively and is posteriorly affixable via detent pins insertable through each of two posterior corner holes thereof and through each of a pair of vertically inclined posterior cross member holes. Finally, an upright rear support unit with footings and vertically inclined through holes in the footings is typically held to each elongated member via wing-nut and bolt complexes with a bolt inserted through each footing through hole and other paired vertically inclined through holes in each elongated member.

The anteriorly attached prybars with or without extender units to which they would be anteriorly affixed serve to facilitate lifting and then carrying such objects as boulders found within or upon the ground. The frame apparatus suitably wheeled and so equipped is pushed downwardly below the boulder via the S-shaped handlebars and then leveled, thus lifting the grounded boulder upwardly to then be transported atop the prybars from one place to another. Placement of a number of logs or thickets of brush on the flooring unit between the right rear support unit and the wheel shield and also atop the wheel shield and between the wheel shield and the frontal upwardly inclined bar portions of an anteriorly positioned load retention unit, enables such loads to be moved about via the S-shaped handlebars or to be pulled by a motor vehicle by way of the Y-shaped posterior pulling unit attached within the posterior sockets in lieu of the then removed S-shaped handlebars.

2. Objects of the Invention

There is an ever present need for an efficient means for readily lifting large pieces of debris or heavy boulders from land in need of clearing. Also, the ultimate need for conveniently transporting such debris and/or boulders from a point of removal to i.e. a truckbed located a distance away is always a consideration, and, as such, is a need requiring fulfillment as well. These needs are all readily met by way of resort to utilization of the instant invention.

The invention is also easily amenable to the ready affixation thereto of attachments that can likewise be readily removed therefrom. The attachments are also readily interchangeable. The invention is very sturdy and provides a ready fulcrum for efficiently leveraging such tasks as lifting bulky, heavy boulders. The feature of ready interchangeability of attachment components also makes for a device that is essentially the equivalent of a plurality of devices thereby resulting in readily discernable costs savings to any owner of the invention.

The instant invention is indeed new, useful and unique in that it, in and of itself functions to readily facilitate accomplishment of any and all of the above described tasks, as well as, also serving, when required, to readily transport, for example, loads of created firewood from the site of a log pile and splitting machine to a neatly stacked pile of such firewood located a distance away.

A DESCRIPTION OF THE DRAWINGS

A DESCRIPTION OF THE PREFERRED EMBODIMENTS

Figure 1:
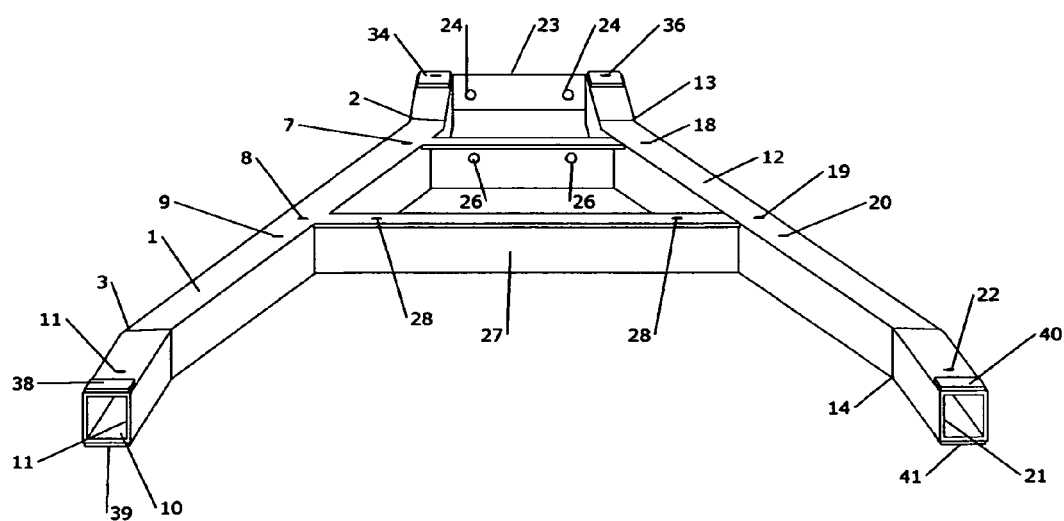
FIG. 1 is a perspective view, back to front of the frame apparatus.
Figure 2:
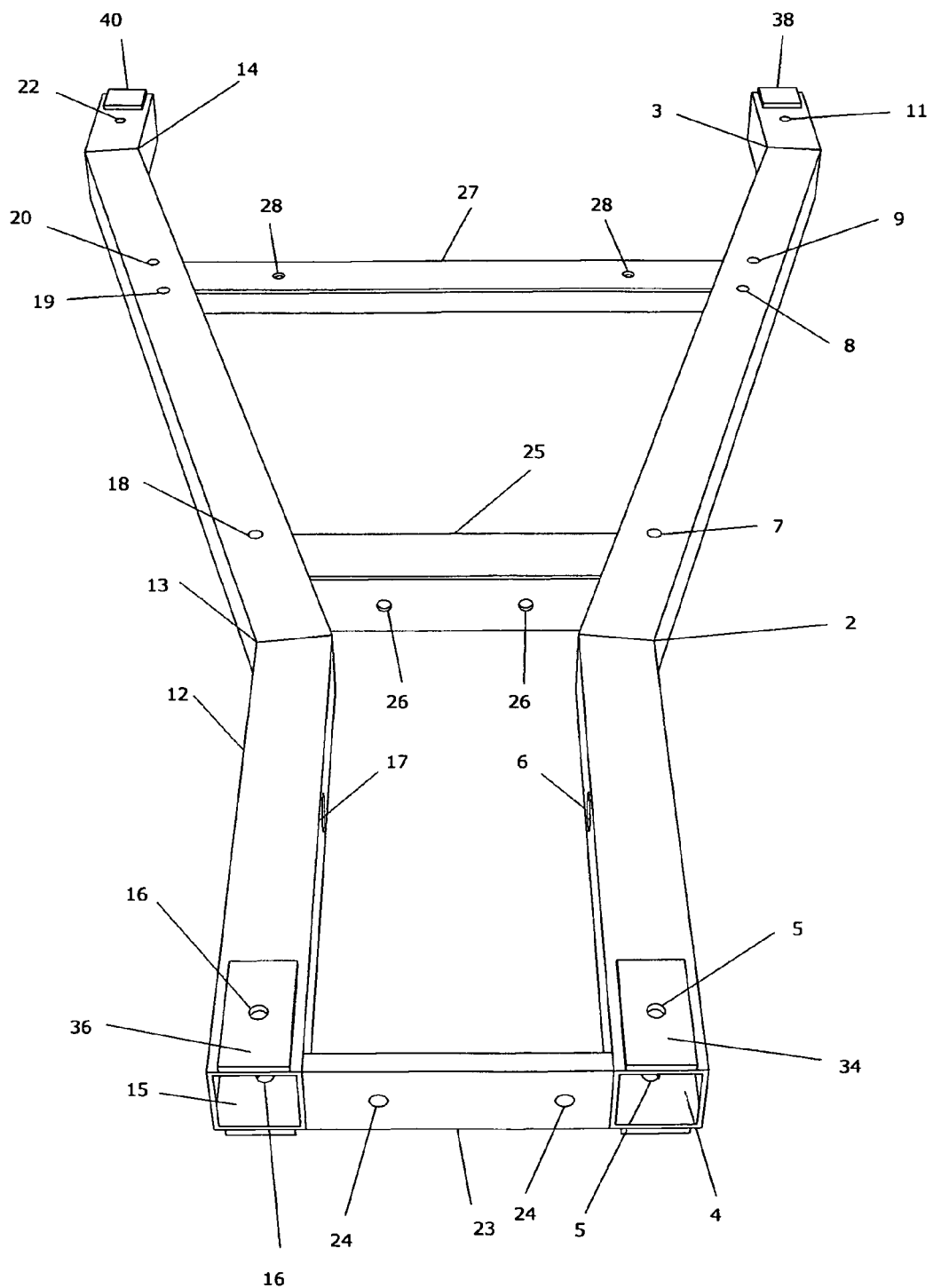
FIG. 2 is a perspective view, front to back of the frame apparatus.
Figure 3:
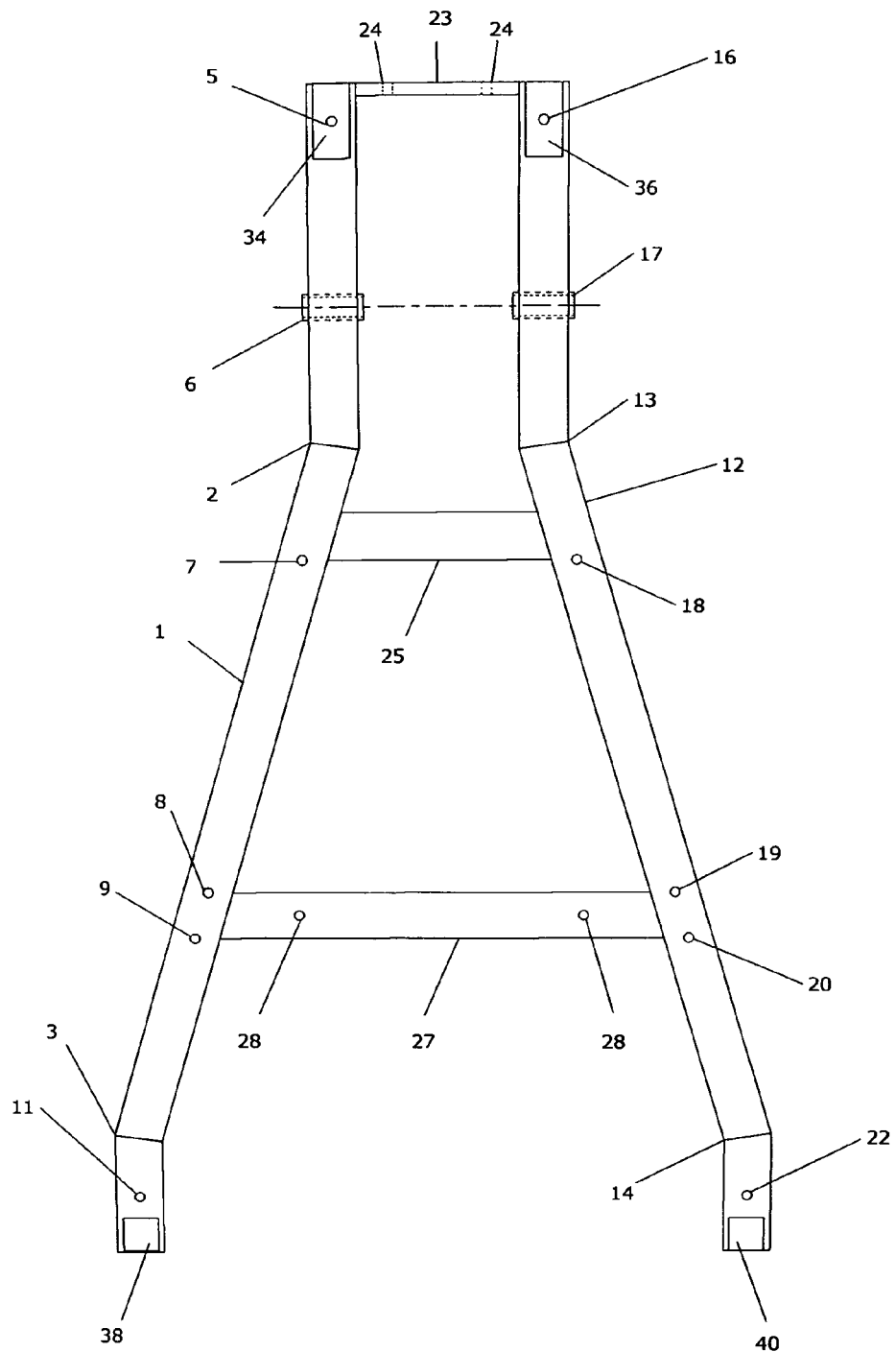
FIG. 3 is a top plan view of the frame apparatus.
Figure 11:
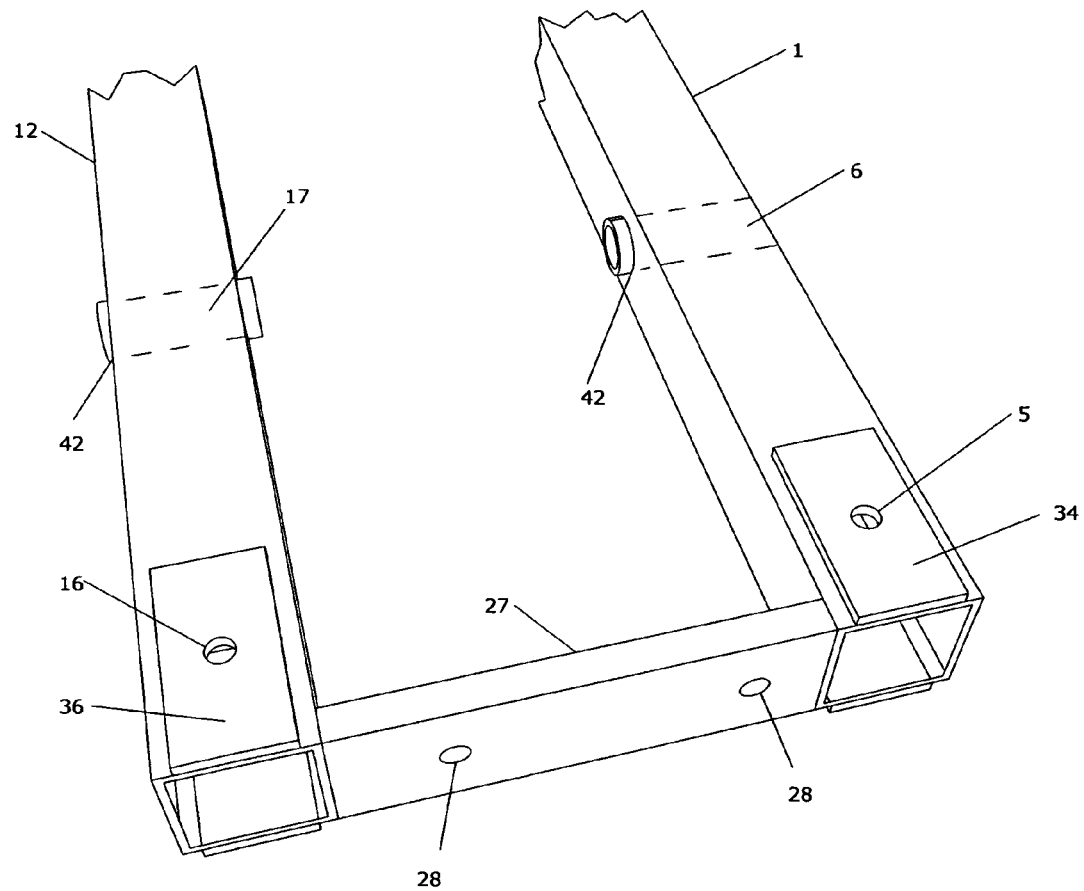
FIG. 11 is an isolated perspective view of the anterior portion of the frame apparatus showing the transverse holes located therein.

The instant invention is a wheelable loadbearing and leveraging frame apparatus that is disclosed with particularly in FIGS. 1-5 of the drawings. The frame apparatus is characterized by the presence of a first elongated member 1. The first elongated member 1 is bent outwardly at a first bend through first angle 2. Member 1 is also bent inwardly at a second bend through second angle 3 which is equal degreewise and oppositely inclined to first angle 2. The first bend is located anterior to the midpoint of member 1 and the second bend is located near the posterior end of member 1. All of the foregoing features are to be noted with reference to any of FIGS. 1-4 inclusive. First anterior socket 4 in member 1 is apparent with reference to FIG. 2. First pair of vertically inclined concentric anterior through holes 5 is also apparent in FIG. 2. FIGS. 2 and 3 as well as FIG. 11 disclose a first pair of concentric transverse holes 6 in member 1 that are horizontally inclined. Holes 6 are located posterior to holes 5 and anterior to the abovesaid first bend. There are also a first pair of vertically inclined concentric medial through holes 7 in member 1. Holes 7 are located posterior to the location of the abovesaid first bend. There are also to be found in member 1, a first pair of vertically inclined concentric posteromedial through holes 8. Moreover, located posterior to holes 8 is a first duplicate pair of vertically inclined concentric posterormedial through holes 9. Holes 7, 8, 9 and posterior socket 10 in member 1 are readily seen in FIG. 1 as are a first pair of vertically inclined concentric posterior through holes 11 shown as located about socket 10 in member 1.

Figure 4:
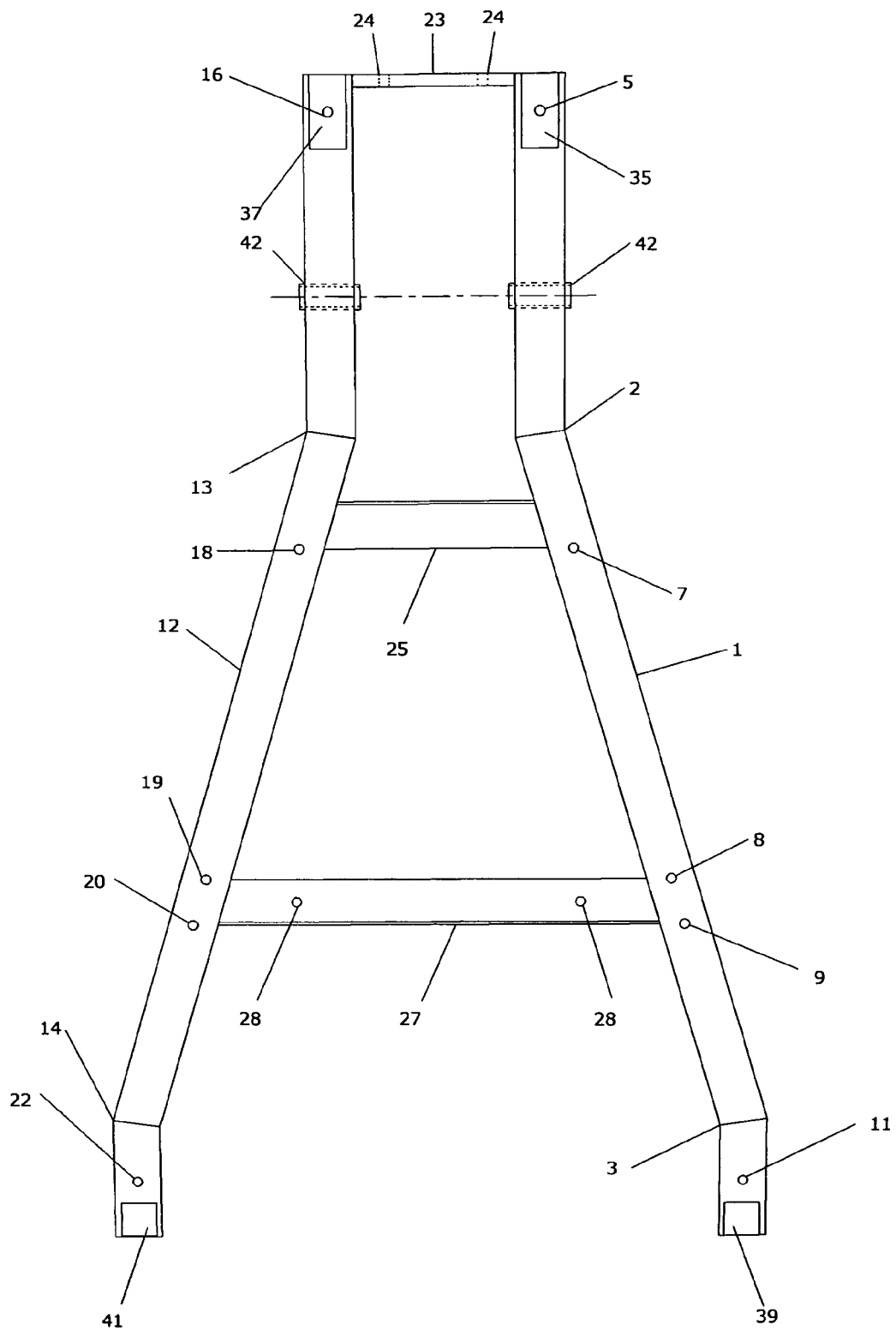
FIG. 4 is a bottom plan view of the frame apparatus.
Figure 5:
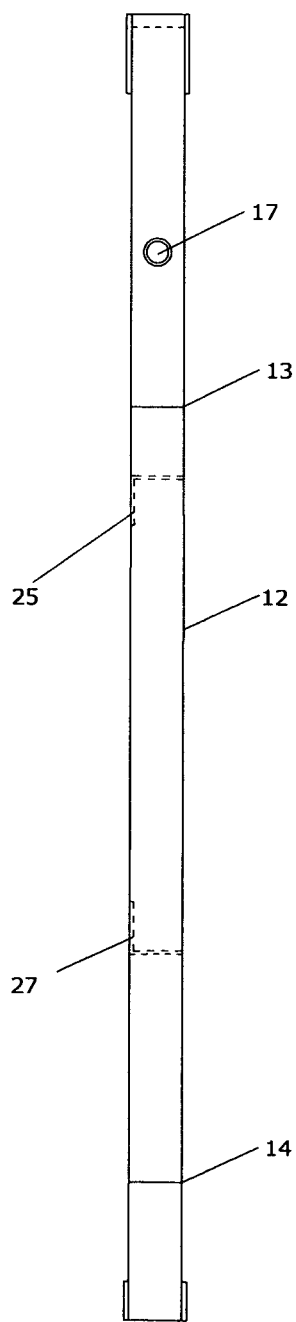
FIG. 5 is a lateral plan view of the frame apparatus.
Figure 6:
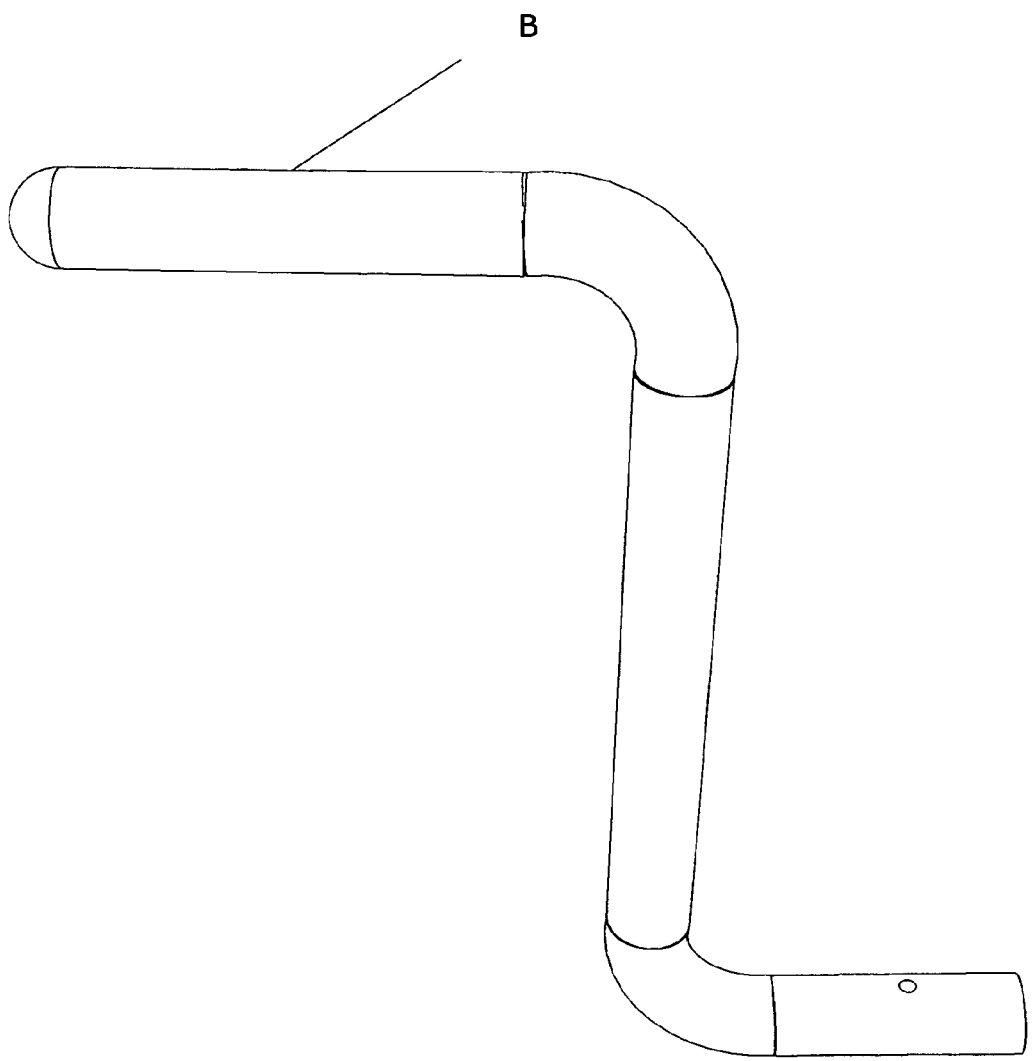
FIG. 6 is an isolated perspective view of an S-shaped handlebar unit attachable to the frame apparatus.
Figure 7:
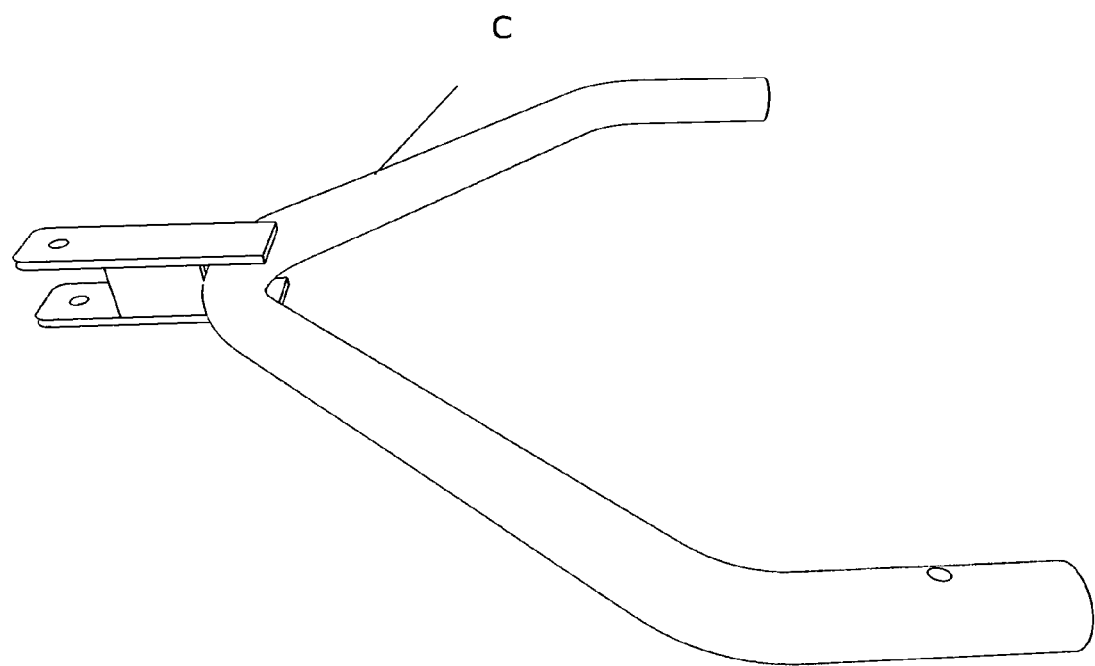
FIG. 7 is an isolated perspective view of a Y-shaped posterior pulling unit attachable to the frame apparatus.
Figure 8:
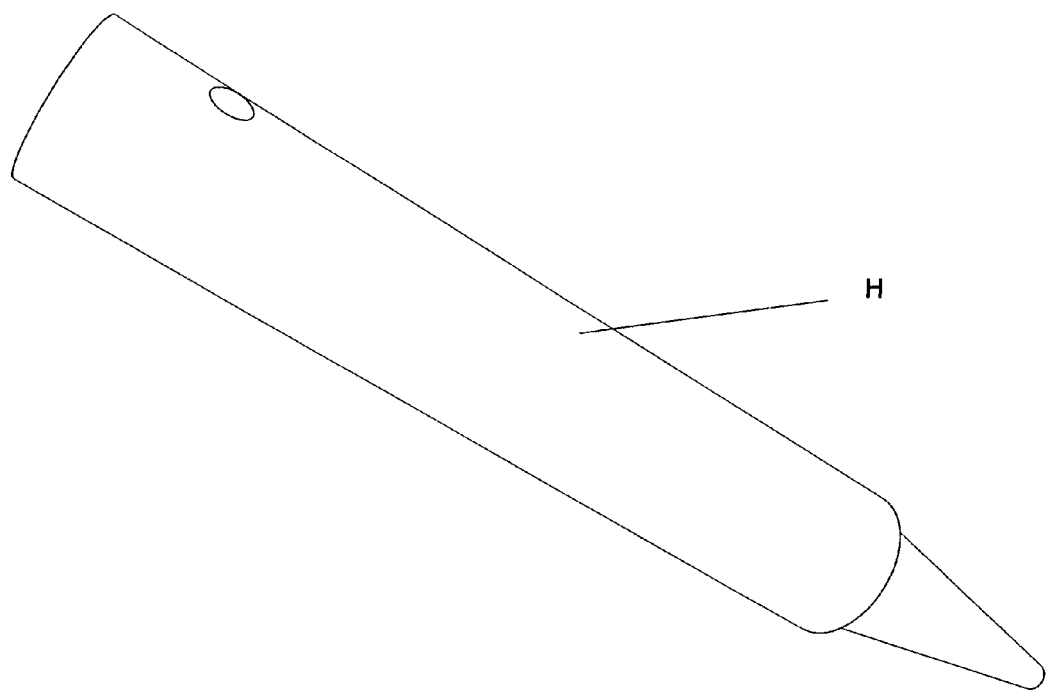
FIG. 8 is an isolated perspective view of a pry bar unit attachable to the frame apparatus.
Figure 9:
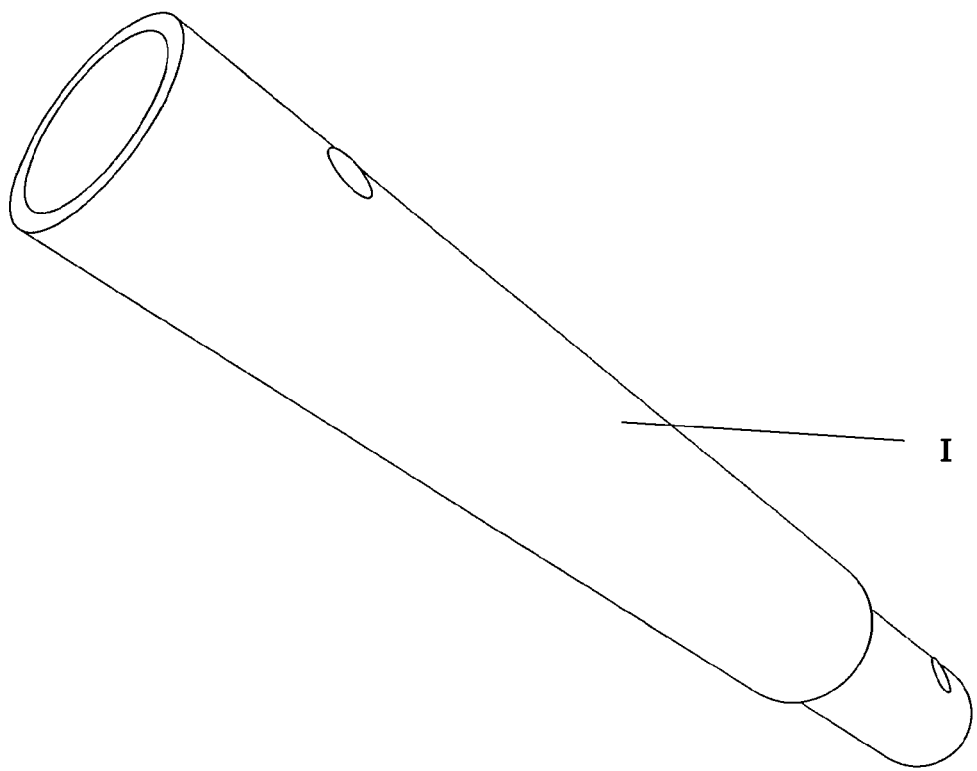
FIG. 9 is an isolated perspective view of an extender unit attachable to the frame apparatus.
Figure 10:
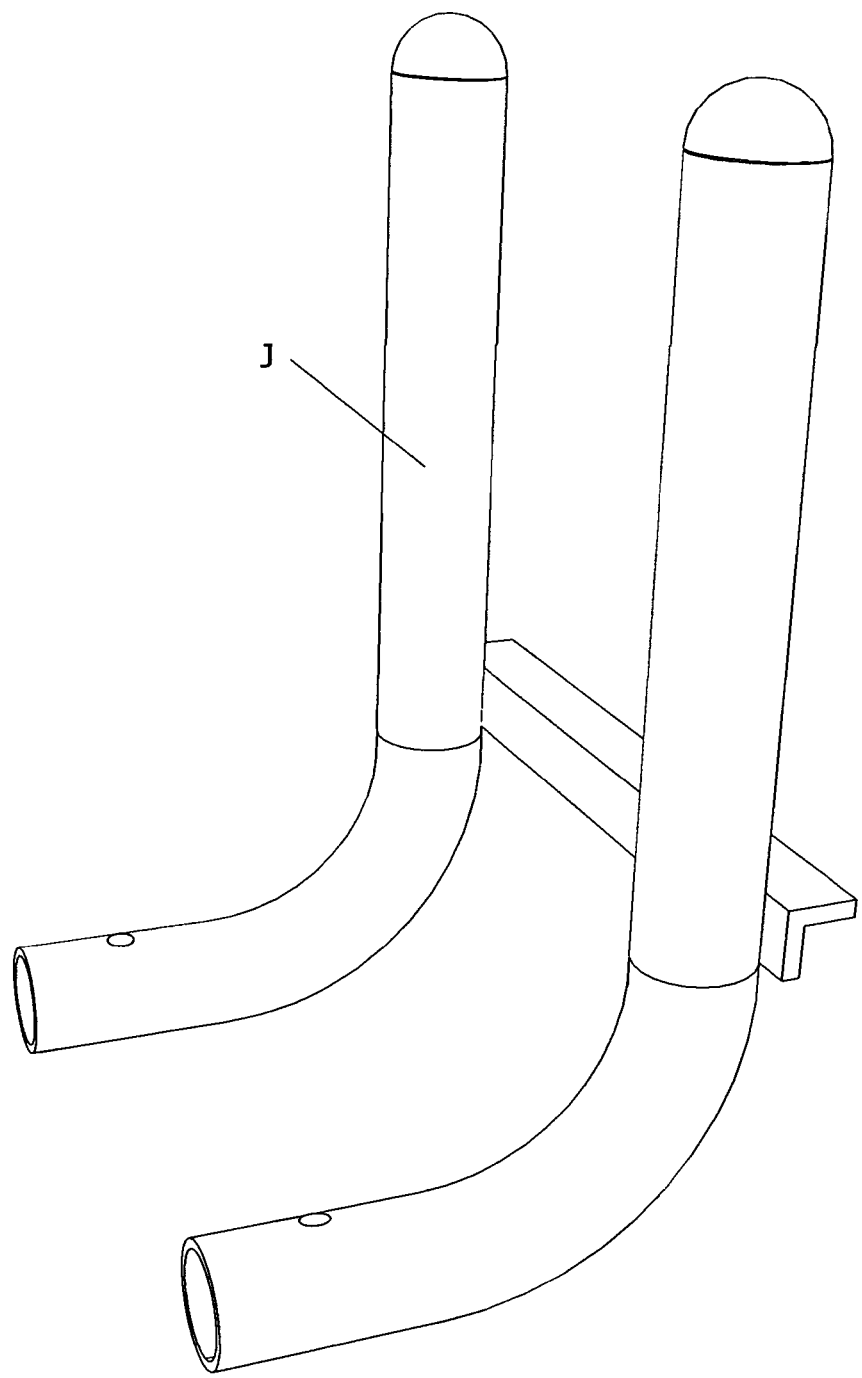
FIG. 10 is an isolated perspective view of a load retention unit affixable to the frame apparatus
Figure 12:
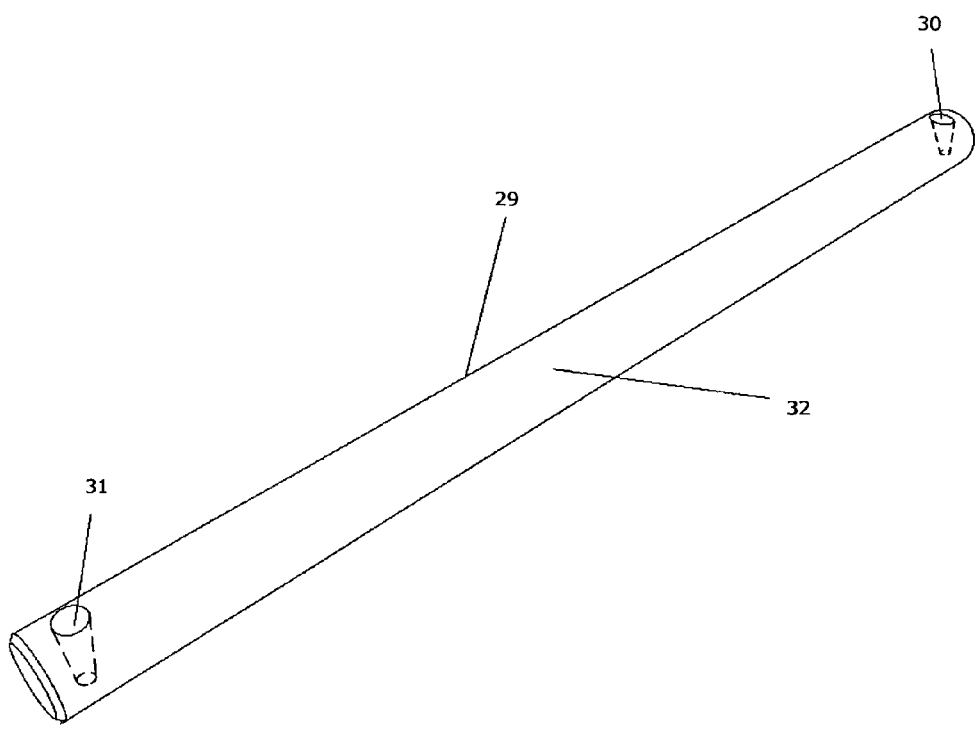
FIG. 12 is an isolated perspective view of a transverse axle unit affixable to the frame apparatus.
Figure 13:
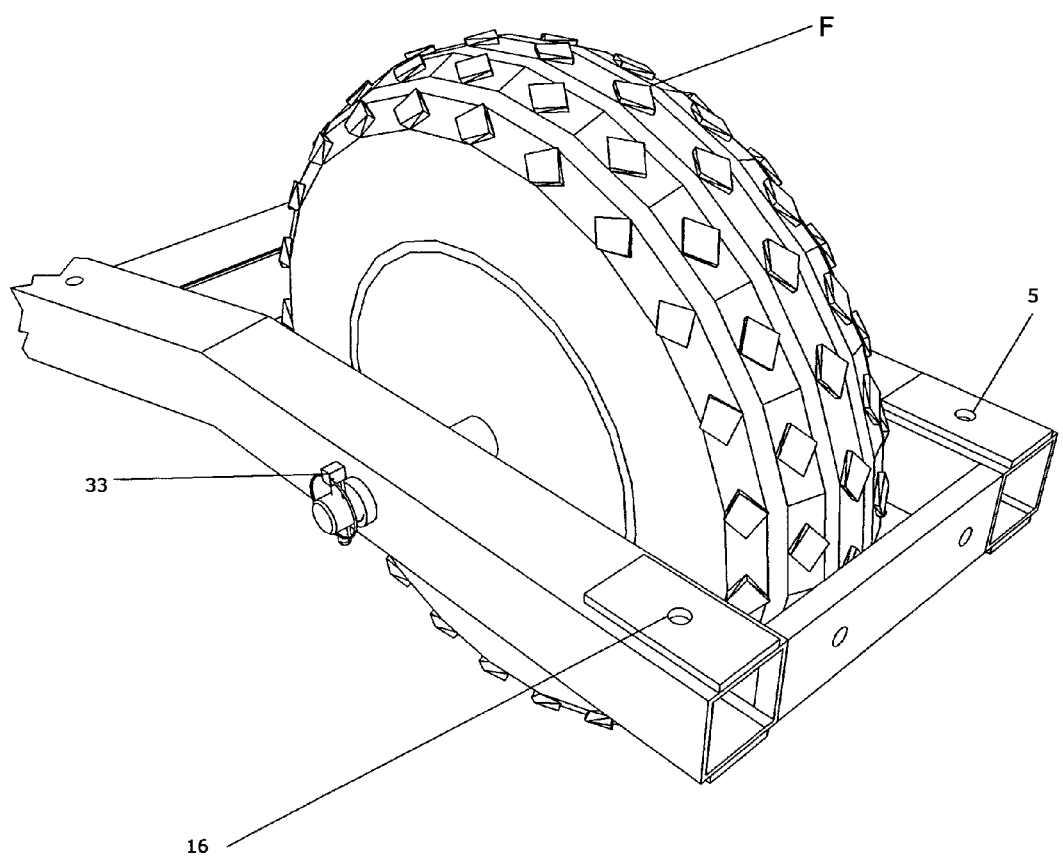
FIG. 13 shows wheeling affixed and held to the transverse axle unit such as is depicted in FIG. 12.
Figure 14:
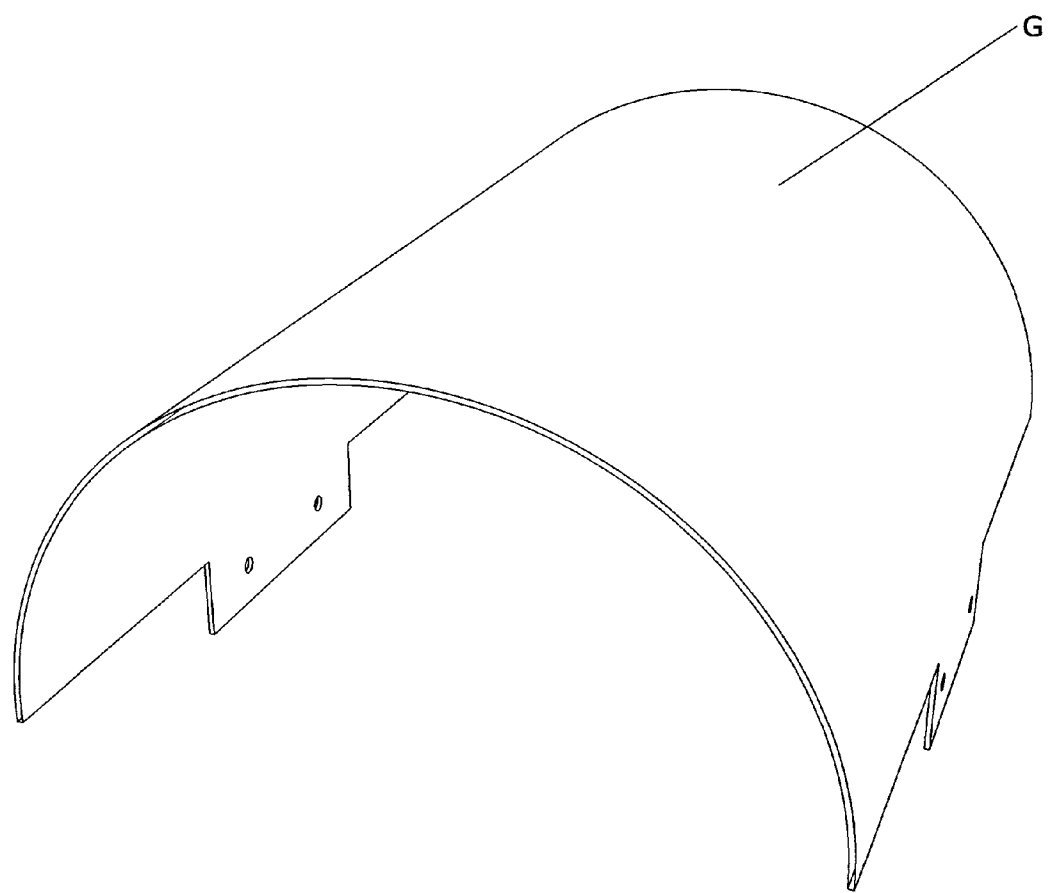
FIG. 14 is an isolated perspective view of the wheel shield attachable to the frame apparatus.
Figure 15:
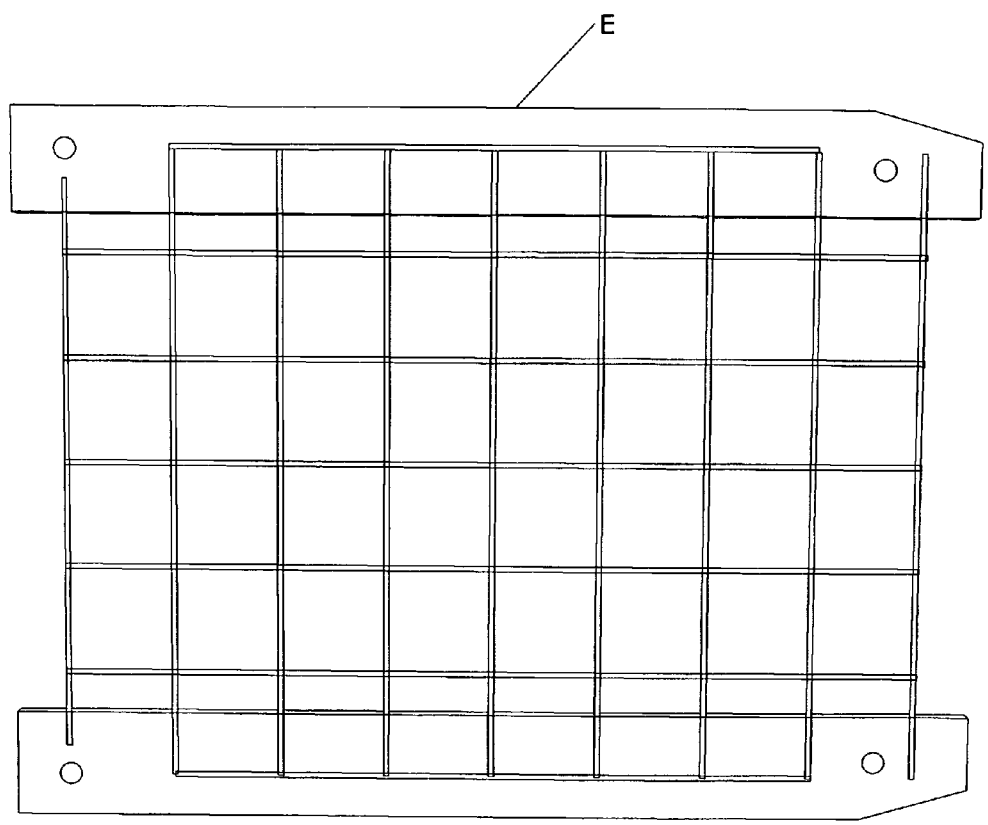
FIG. 15 is an isolated perspective view of the flooring unit attachable to the frame apparatus.
Figure 16:
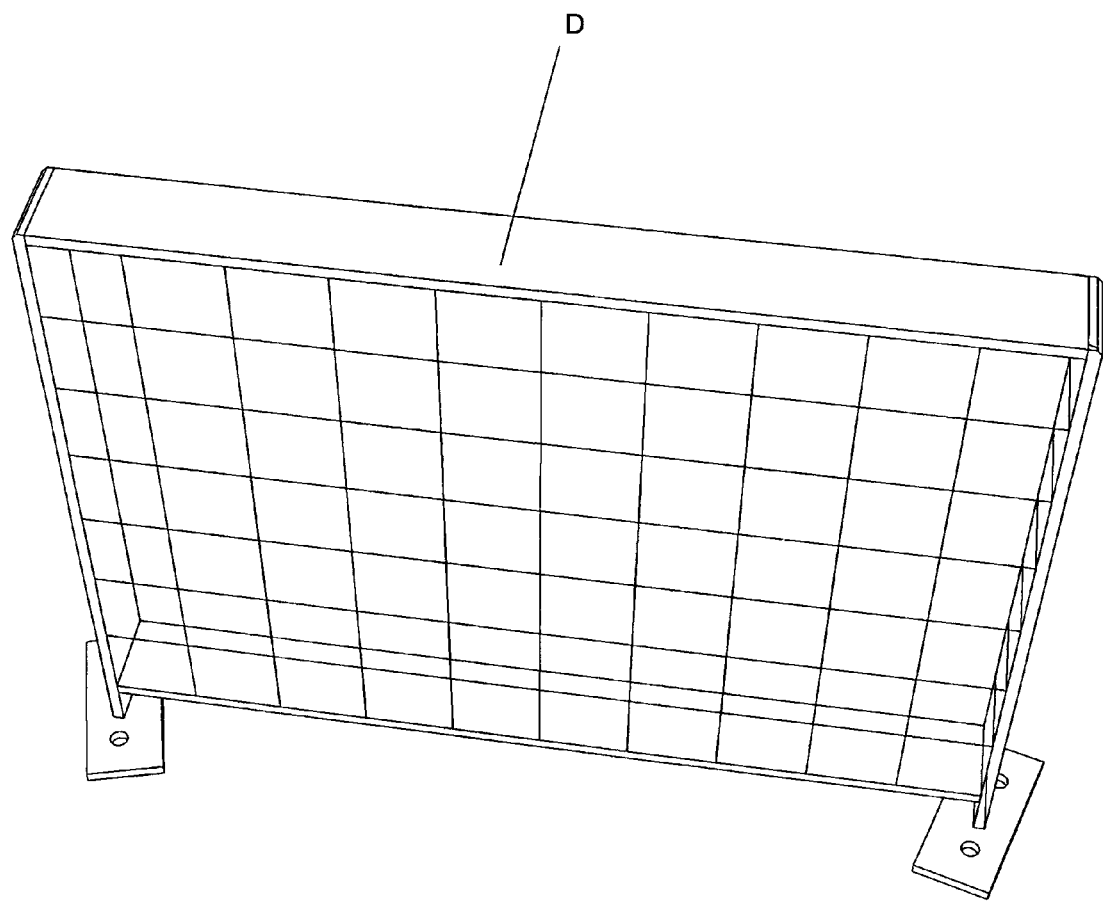
FIG. 16 is an isolated perspective view of the upright rear support unit attachable to the frame apparatus.
Figure 17:
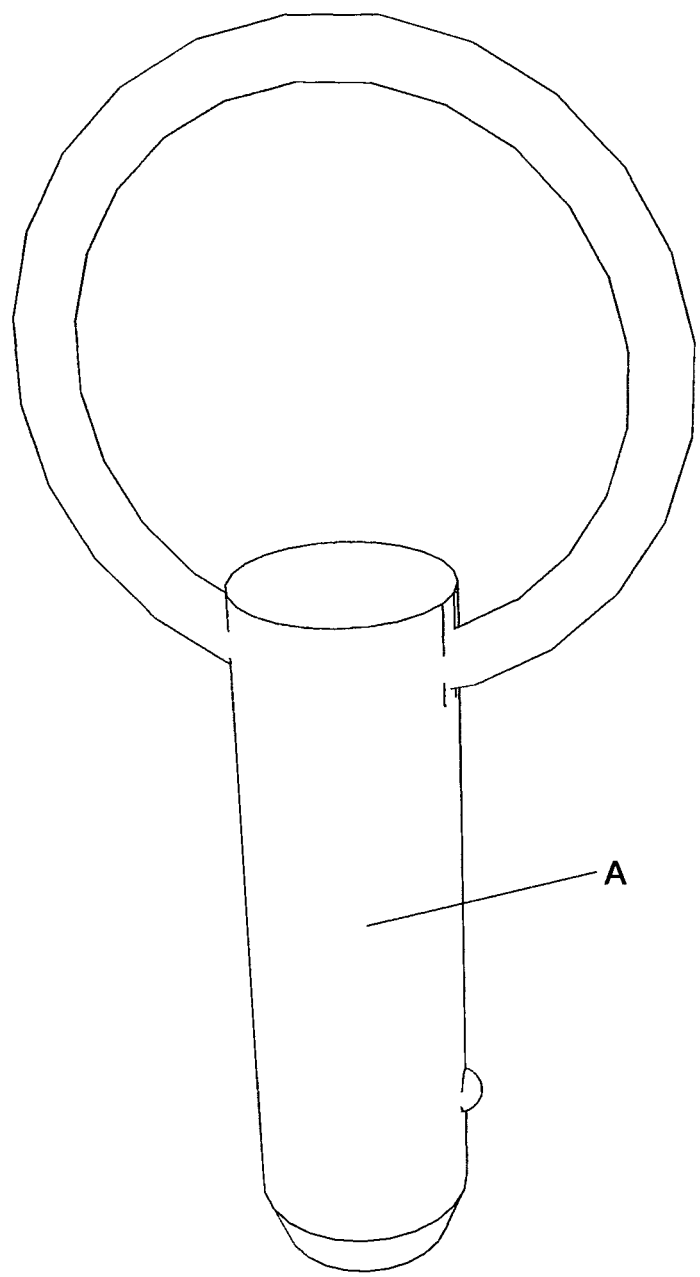
FIG. 17 is an isolated perspective view of a detent pin.
Figure 18:
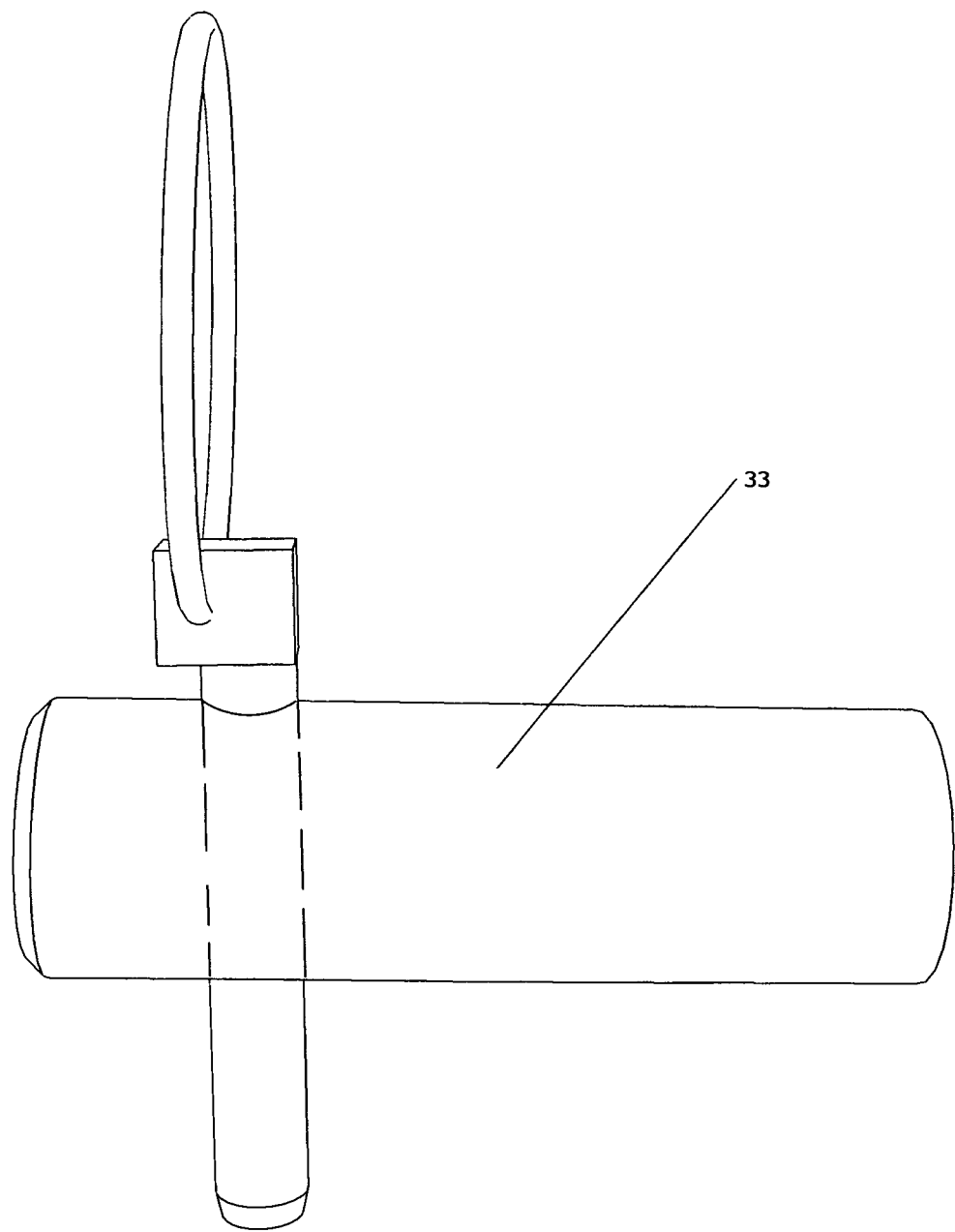
FIG. 18 is an isolated perspective view of an open lynch pin inserted into a transverse axle end hole.
Figure 19:
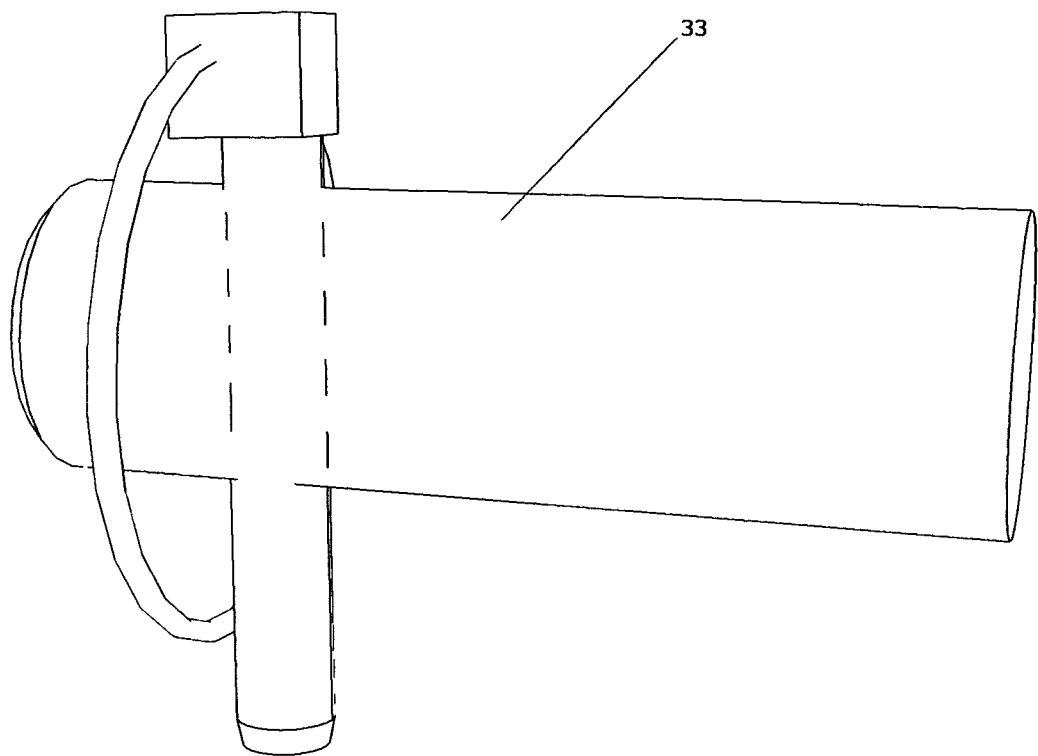
FIG. 19 is an isolated perspective view of the lynch pin of FIG. 18, but in a closed position.
Figure 20:
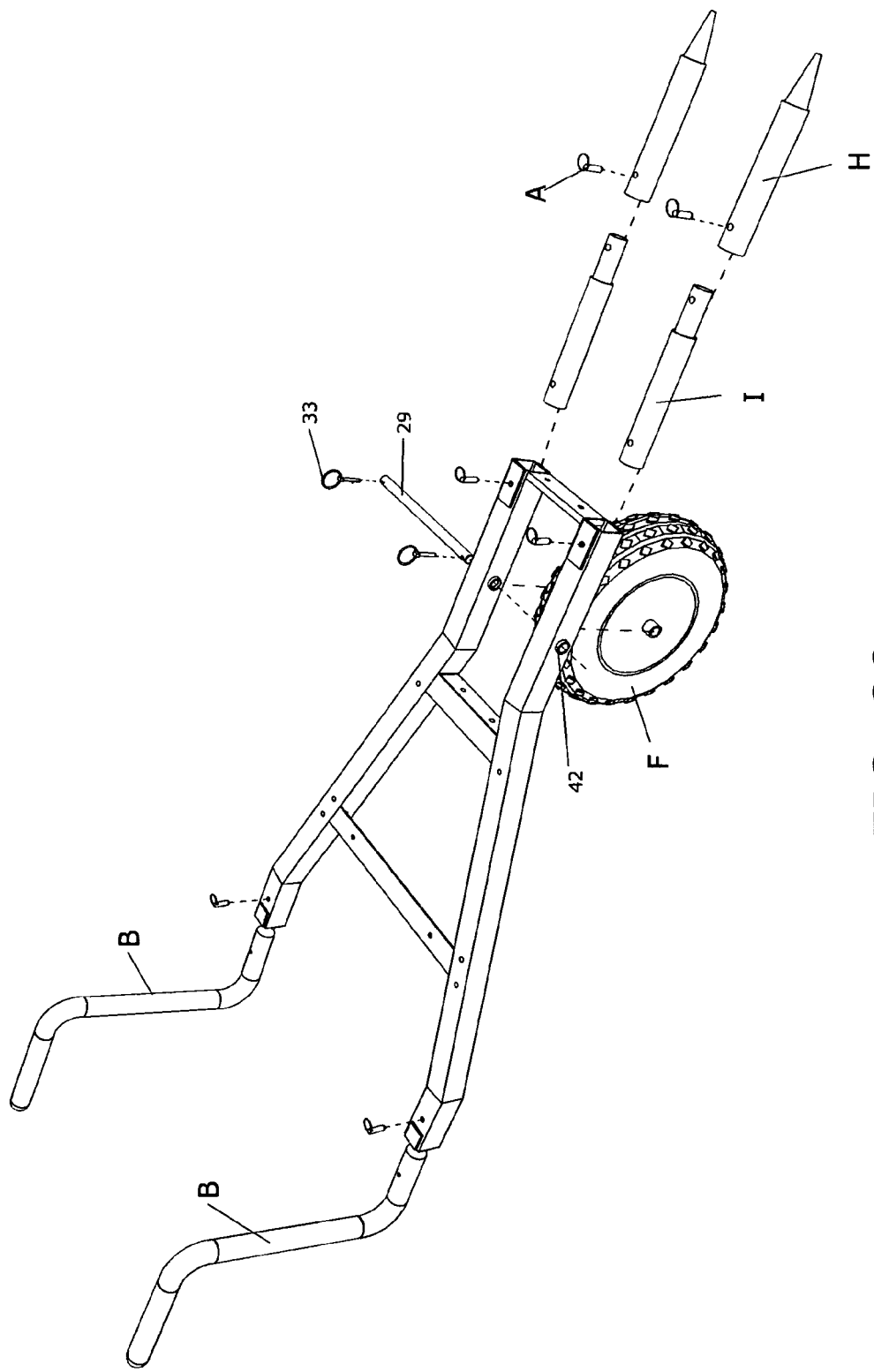
FIG. 20 is an exploded view showing the frame apparatus, equipped with S-shaped handlebars, wheeling, extenders and pry bars.
Figure 21:
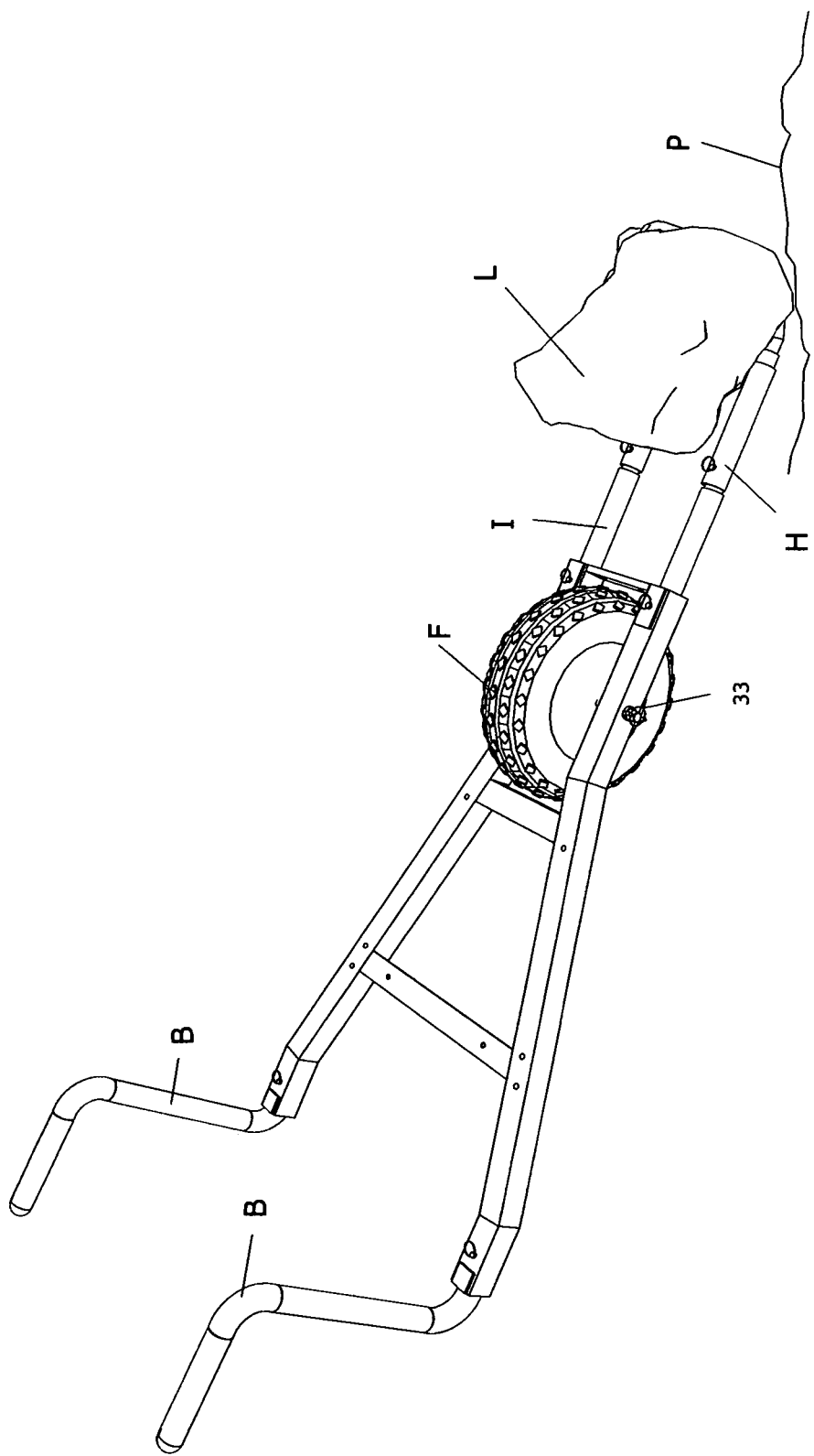
FIG. 21 shows use of the invention as shown in FIG. 20 with the attachments therein shown in an assembled state and serving to dislodge a grounded boulder.
Figure 22:
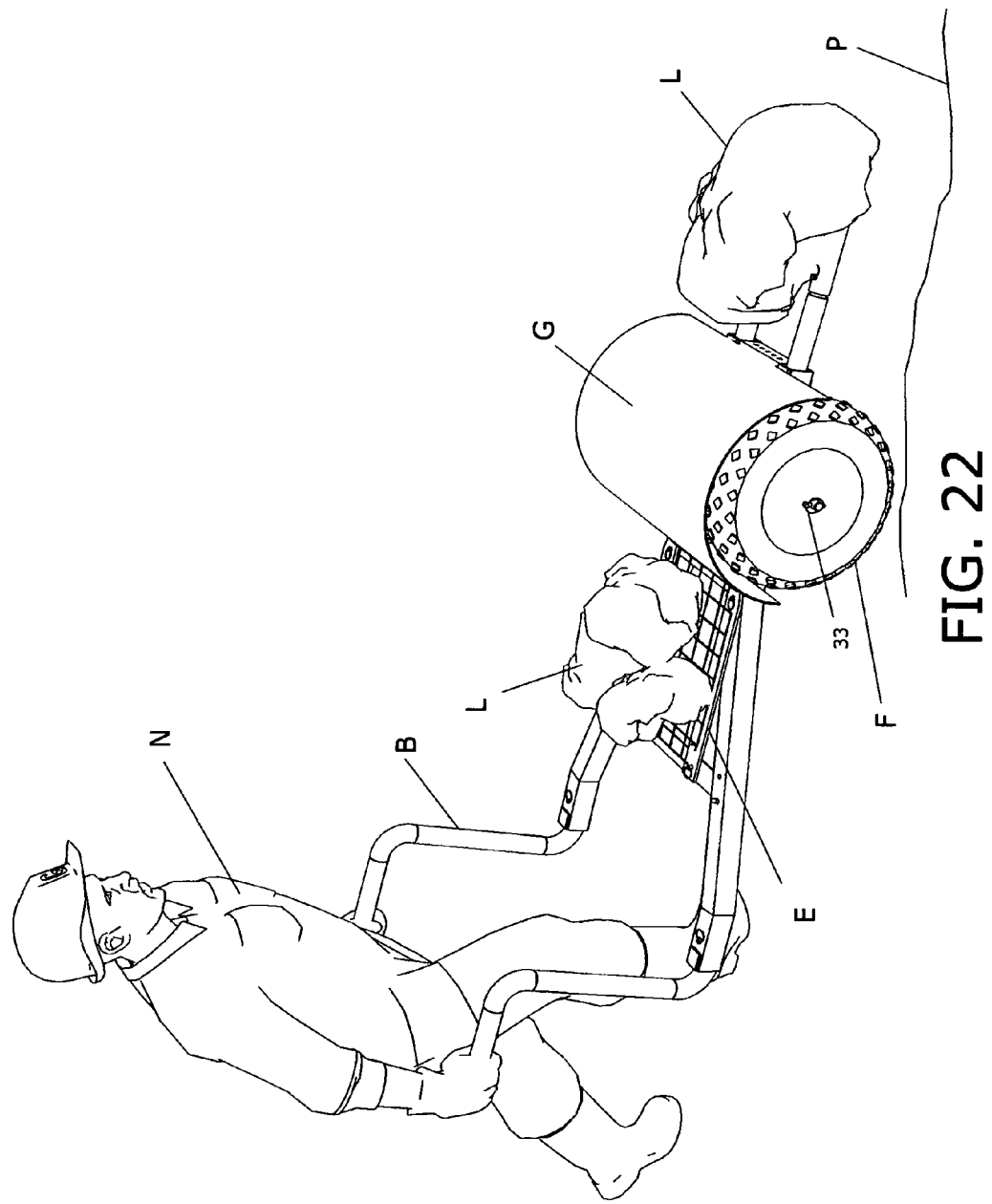
FIG. 22 shows use of the frame apparatus with attachments being utilized to transport dislodged boulder.
Figure 23:
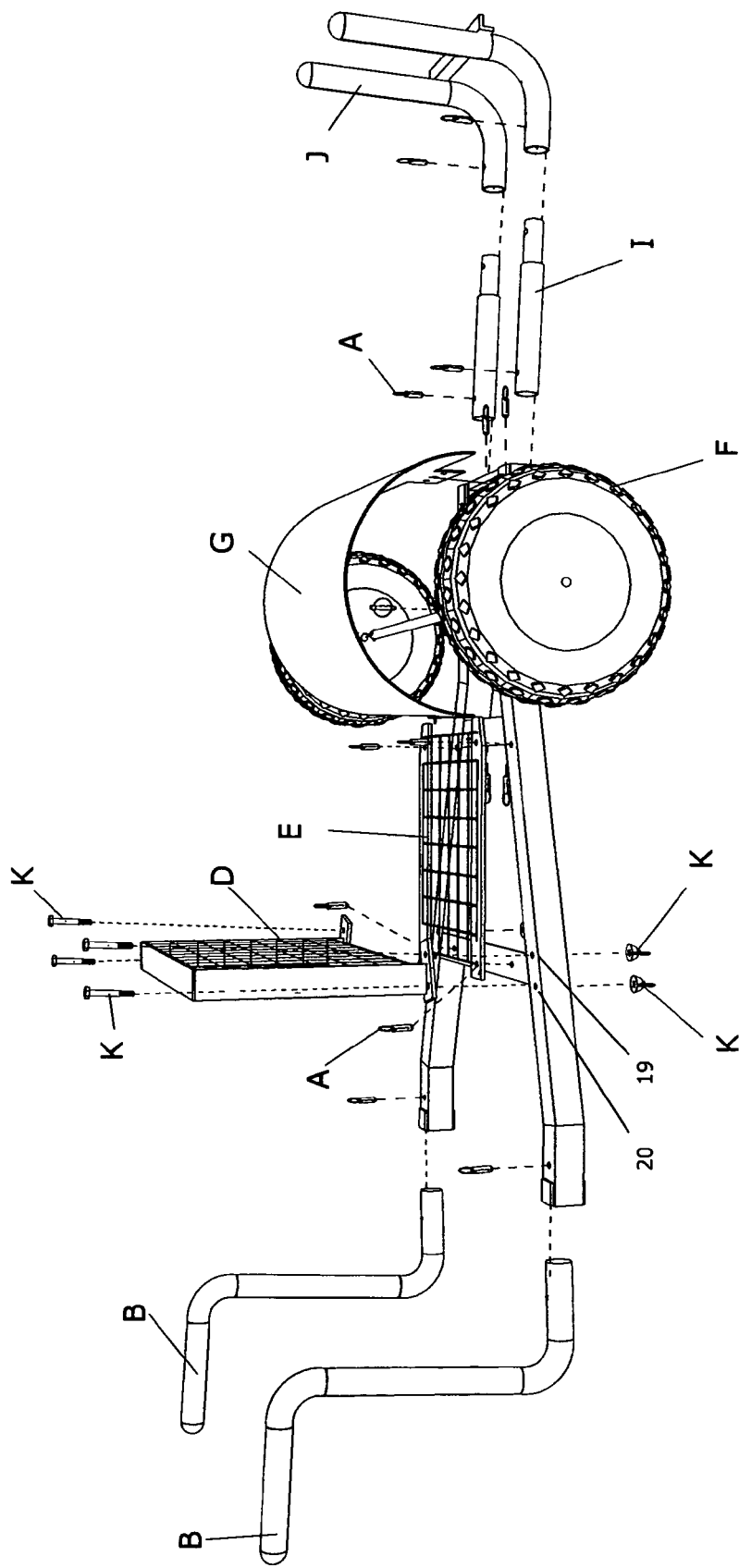
FIG. 23 is an exploded view of the frame apparatus, equipped with handlebars, wheeling, a wheelshield, a flooring unit, a rear support unit, extenders and a load retention unit.
Figure 24:
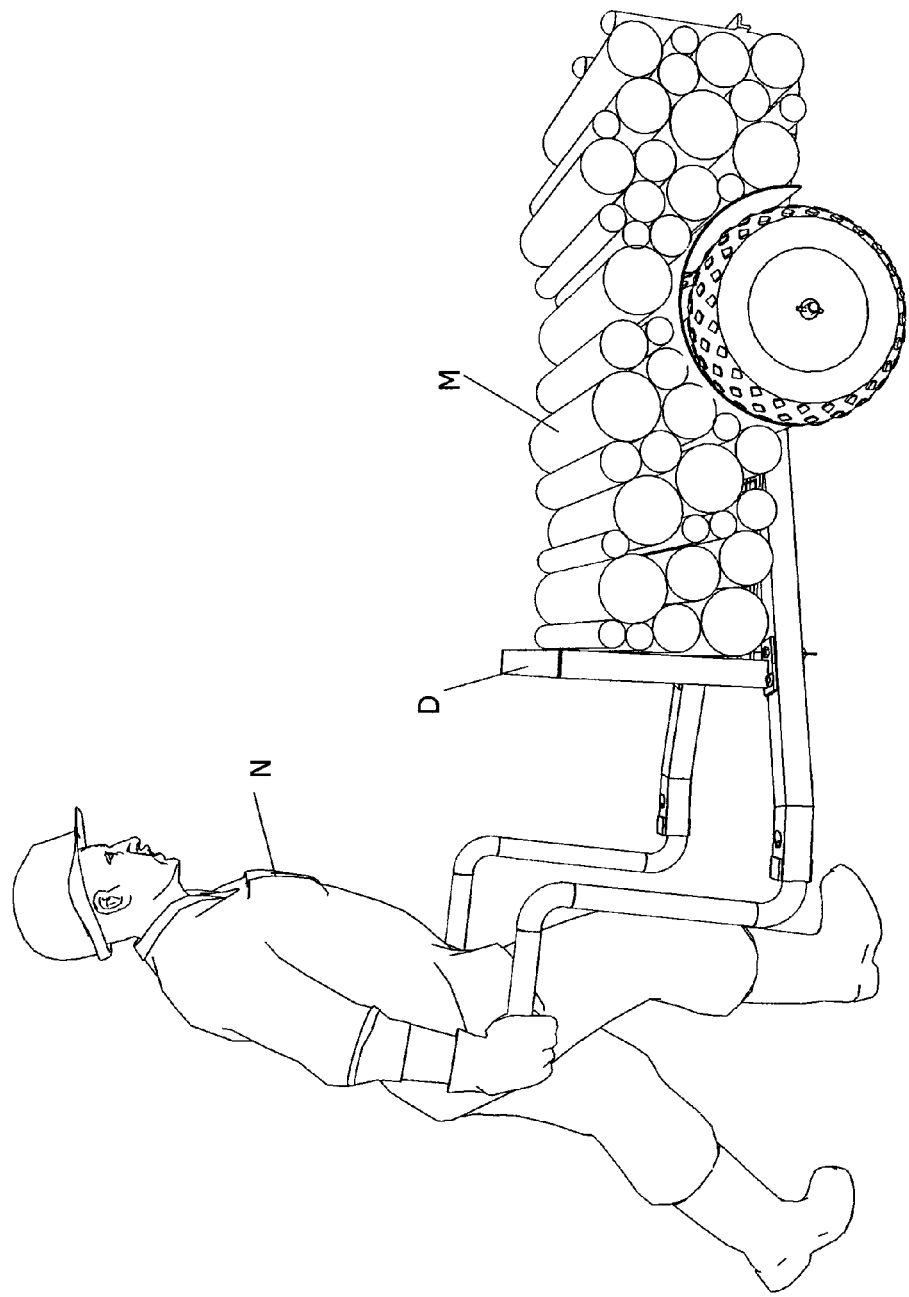
FIG. 24 shows a load of logs being pushed utilizing the frame apparatus with attachments from one location to another.
Figure 25:
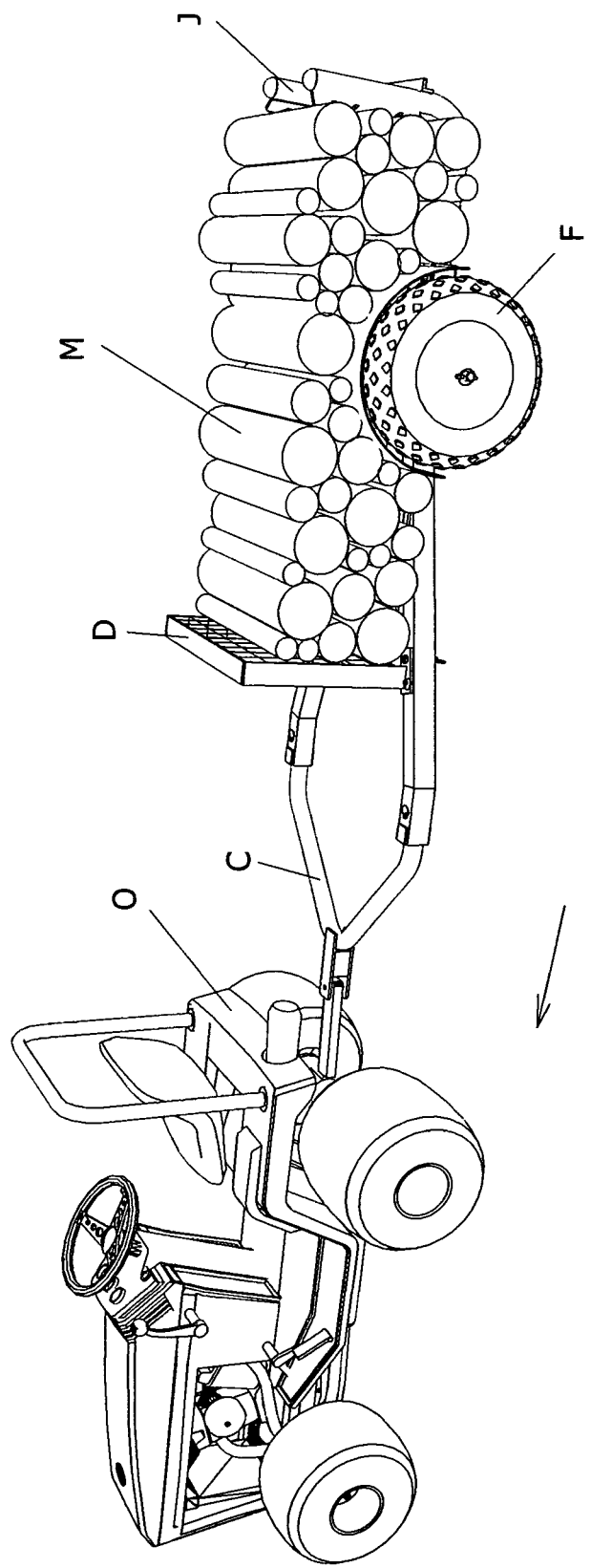
FIG. 25 shows the load of logs depicted in FIG. 24 being pulled by a vehicle from one location to another.

The invention is moreover characterized by the presence of a second elongated member 12 being dimensionally equivalent to member 1. Member 12 is seen in FIGS. 1-5. Member 12 like member 1 is also bent outwardly at a first second member bend through a first second member angle 13 as seen in, for example, FIG. 1. Member 12 is also bent inwardly at a second, second member bend through a second, second member angle 14 as seen in FIG. 1 as well. Angle 14 is degreewise equal to, but oppositely inclined to angle 13. The above-referenced first second member bend is located anterior to a midpoint of member 12. The above-referenced second, second member bend is located near the posterior end of member 12. Angle 13 is equal degreewise to angle 2, and; angle 14 is equal degreewise to angle 3. Second anterior socket 15 in member 12 is apparent in FIG. 2. Second pair of vertically inclined anterior through holes 16 is also apparent in FIG. 2 and seen about socket 15. FIGS. 2 and 3 as well as FIG. 11 also disclose a second pair of concentric horizontally inclined transverse holes 17 in member 12. Holes 17 are located posterior to the location of holes 16 and anterior to the location of the above-mentioned first second member bend as can be appreciated with reference to FIGS. 2 and 3. Second pair of vertically inclined concentric medial through holes 18 in member 12 are shown, for example, in FIG. 2 as being located posterior to the location of the first second member bend in member 12. Second pair of vertically inclined concentric posteromedial through holes 19 in member 12 can be noted with reference to FIGS. 2 and 4 as can a second duplicate pair of vertically inclined concentric posteromedial through holes 20 located posterior to holes 19. Second posterior socket 21 is clearly seen in FIG. 1 as are second pair of vertically inclined concentric posterior through holes 22 located about socket 21 in member 12 as seen with reference to FIGS. 1 and 4. Rectangularly shaped anterior cross member 23 is conjoined at first end edging thereof to an anteriormost portion of medial walling of member 1 and at second end edging thereof to an anteriormost portion of medial walling of member 12. Cross member 23 is characterized by the presence of a plurality of collinear horizontally inclined holes 24. Right angularly formed medial cross member 25 is conjoined at first end edging thereof to the medial walling of member 1 posterior to the location of first member bend at first angle 2 and immediately anterior to the location of holes 7 in member 1, and; at second end edging thereof to the medial walling of member 12 posterior to the location of first second member bend at first second member angle 13 and immediately anterior to the location of holes 18 in member 12. There is a plurality of collinear horizontally inclined medialwise member holes 26 located in the vertically inclined portion of medial cross member 25. The vertically inclined portion of cross member 25 is located anteriorly to the horizontally inclined portion thereof when medial cross member 25 is conjoined, as noted above, to members 1 and 12 respectively. There is also a right angularly formed posterior cross member 27 that is conjoined at first end edging thereof to member 1 such that anterior edging of horizontally inclined posterior portion of cross member 27 lies immediately anterior to the location of posteromedial holes 8 and is conjoined at second end edging thereof to the medial walling of member 12 such that the anterior edging of the horizontally inclined posterior portion thereof lies immediately anterior to the second pair of posteromedial holes 19. There is a plurality of collinear vertically inclined posterior cross member through holes 28 located in cross member 27. Cross members 23, 25 and 27 as well as holes 24, 26 and 28 are readily seen in FIGS. 1 and 2. At this juncture, it should be noted that members 1, 12, 23, 25 and 27 could be cylindrically shaped as well as being shaped as shown in FIGS. 1-5. FIG. 12 shows transverse axle 29 along with first axle through hole 30, second axle through hole 31, a midpoint 32 of axle 29 and FIGS. 13, 18 and 19 show a lynch pin 33. The frame apparatus equipped with a transverse axle 29 and, in turn holding lynch pins 33 within holes 30 and 31 respectively is a more elaborate embodiment of the invention. An optional first rectangularly shaped reinforcement unit 34 with a centerhole is affixed to the topside of the anterior end of member 1 in such a way that the centerhole is positioned concentrically with holes 5. An optional second rectangularly shaped reinforcing unit 35 also with a centerhole is affixed to the bottom side of the anterior end of member 1 such that the centerhole thereof is positioned concentrically with holes 5. Units 34 and 35 are seen in, for example, FIGS. 1 and 4 respectively. An optional third rectangularly shaped reinforcing unit 36 with a centerhole is affixed to the topside of the anterior end of member 12 such that the centerhole thereof is positioned concentrically with holes 16. Finally, in such respects, an optional fourth rectangularly shaped reinforcing unit 37 with a centerhole is affixed to the bottom side of the anterior end of member 12 such that the centerhole thereof is positioned concentrically with holes 16. Units 36 and 37 are also shown in FIGS. 1 and 4 respectively. There is also an optional first posterior reinforcing unit 38 affixed to the topside of the posterior end of member 1 posterior to the location of the top one of holes 11. Optional second posterior reinforcing unit 39 is affixed to the bottom side of the posterior end of member 1 and posterior to the location of the bottom one of holes 22. An optional third posterior reinforcing unit 40 is affixed to the topside of the posterior end of member 12 posterior to the location of the top one of holes 22. An optional fourth posterior reinforcing unit 41 is affixed to the bottomside of the posterior end of member 12. Units 38, 39, 40 and 41 can be seen with reference to FIGS. 1 and 4. It should be noted that units 34, 35, 36, 37, 38, 39, 40 and 41 could also be circular or ovalesque in shape. Sleeving 42 is shown in FIG. 4 and is affixed within transverse holes 6 and 17 respectively. Conjunction of cross member 23, 25 and 27 with member 1 and 12 is accomplished by way of welds or strong adhesive agents. Similarly, affixation of units 34, 35, 38 and 39 to member 1 and units 36, 37, 40 and 41 to member 12 is accomplished by way of welds or strong adhesive agents. Likewise, sleeving 42 is similarly affixed within holes 6 and 17 as can be noted with particularity with reference to FIG. 11. Wheeling F shown in FIG. 13 is affixed to axle 29 inserted through the centerhole of wheeling F. Lynch pins 33 as shown in open and closed states respectively in FIGS. 18 and 19 are inserted through holes 30 and 31 respectively in axle 29. Holes 30 and 31 are equidistant from midpoint 32 of axle 29. A longer axle 29 can serve to accommodate as many as two or three wheels F by simply inserting axle 29 through centerhole in wheeling F and through transverse holes 6 and 17. In the case of a resorting to utilization of two or three wheels F instead of only one wheel F, the additional wheels F would be mounted to axle 29 just lateral to lateral walling of each of members 1 and 12 rather than between the members 1 and 12 as shown in FIG. 13. Once wheeling F is so mounted as noted above and preferably to an axle 29 first inserted through sleeving 42 and once lynch pins 33 are inserted in a open state through holes 30 and 31, pins 33 are then put into their locked positions as shown in FIG. 19 to then securely hold wheeling F in place while nevertheless being free to rotate as the fully assembled frame apparatus is moved about from place to place. Handlebars B, one of which is shown in FIG. 6 are typically S-shaped and serve, when attached to the fully assembled frame apparatus, to enable a person N to push the frame apparatus; with attachments affixed thereto, and carrying a load of, for example, boulders L; from place to place as shown in FIG. 22. FIG. 24 shows a person N pushing a load of logs M loaded onto the fully assembled frame apparatus complete with other attachments. A Y shaped posterior pulling unit C shown in FIG. 7 when attached to the fully assembled frame apparatus; with attachments affixed thereto, and carrying a load, for example, logs M, enables the frame apparatus and load to be pulled by a vehicle O from place to place as shown in FIG. 25. Handlebars B and Y shaped posterior pulling unit C are attached to the fully assembled frame apparatus by way of resort to the utilization of detent pins A one of which is shown in FIG. 17. Pins A are inserted through the holes in handlebars B or pulling unit C shown in FIGS. 6 and 7 respectively and also through posterior through holes 11 in member 1 and posterior through holes 22 in member 12 so as to thereby ensure dependable affixation of handlebars B or pulling unit C to the fully assembled frame apparatus in contemplation of pushing or pulling loads. FIGS. 8 and 9 show respectively a prybar H and an extender unit I. FIG. 10 shows a load retention unit J. Prybars H are affixable via detent pins A inserted through holes in prybars H as shown in FIG. 8 and through anterior through holes 5 of member 1 and anterior through holes 16 of member 12 as can be seen indirectly with reference to FIG. 20. FIG. 20 shows extender units I affixable to the fully assembled frame apparatus by way of insertion of detent pins A through holes in units I seen in FIG. 9 and through anterior through holes 5 and 16 respectively. In FIG. 20, it will be noted how prybars H are affixable to extender units I by way of detent pins A inserted through anterior holes in units I shown in FIG. 9 and the holes in prybars H shown in FIG. 8. However, prybars H could just as easily be affixed directly to the fully assembled frame apparatus by way of detent pins A inserted through the holes in prybars H shown in FIG. 8 and then through holes 5 and 16 respectively. Prybars H affixed to the fully assembled frame apparatus as noted above serve to enable a person N to utilize the invention to dislodge boulders L from locations within the earth where they might be found as can be noted with reference to FIG. 21. Utilization of the invention with attached extender units I and prybars H in turn attached to extender units I provides an extended load bearing surface for purposes of carrying an enhanced number of dislodged boulders L or logs M. The load retention unit J shown in FIG. 10 is attachable to the fully assembled frame apparatus by way of insertion of detent pins A through holes in J seen in FIG. 10 and then either also through holes 5 and 16 or through the anterior holes in extender units I in turn held as noted above to the fully assembled frame apparatus via detent pins A inserted through posterior holes therein and also holes 5 and 16. FIGS. 14, 15 and 16 show respectively a wheel shield G, a flooring unit E and a rear support unit D, all being further attachments readily amenable to affixation to the fully assembled frame apparatus. Wheel shield G is attached to the fully assembled frame apparatus as follows. Detent pins A are inserted through holes in wheel shield unit G as are shown in FIG. 14. Pins A are then also inserted through horizontally inclined collinear holes 24 in anterior cross member 23 and through horizontally inclined collinear holes 26 in medial cross member 25. Flooring unit E is attached to the fully assembled frame apparatus as follows. Detent pins A are inserted through each of the corner holes in flooring unit E as are shown in FIG. 15. Pins A are then also inserted through first pair of medial holes 7, second pair of medial holes 18 and posterior cross member holes 28. Such an attachment mode is illustrated with reference to FIGS. 22 and 23. Rear support unit D is attached to the fully assembled frame apparatus as follows. Detent pins A are inserted through holes found in the base footings of the rear support unit D such as are shown in FIG. 16. Pins A are also insertable for such purposes through posteromedial holes 8, duplicate posteromedial holes 9 all found in member 1 and second posteromedial holes 19 and second duplicate posteromedial holes 20 all found in member 12. For purposes of ensuring enhanced stability of attachment of rear support unit D to the fully assembled frame apparatus, all detent pins A utilized as noted just above for such a purpose could instead be replaced with nut and bolt complexes K for such attachment purposes. Nut and bolt complexes K for affixation purposes involving not only merely rear support unit D as shown in FIG. 23 could for that matter, also be involved in affixation of any of the other above-mentioned attachments B and/or C and/or E and/or G and/or H and/or I and/or J to the fully assembled frame apparatus as well in order to serve to enhance sturdiness of attachment as compared to detent pins A otherwise utilized as noted above for such purposes. But, detent pins A much moreso than nut and bolt complexes K make for much greater ease in respect of any contemplated disassembly from the frame apparatus of any of the above-described attachment units B or C or D or E or G or H or I or J.

The fully assembled frame apparatus together with wheeling F affixed thereto along with attachments B and H or H and I also affixed thereto can readily serve to enable a person to easily dislodge boulders L from where found in earth P as seen in FIG. 22 and then easily carry them away to another site. Person N simply pushes upwardly and forwardly on handlebars B to thereby insert prybars H under a boulder L and then person N simply pushes downwardly on handlebars B to then dislodge boulder L. Person N by pushing downwardly even moreso on handlebars B can then cause a dislodged boulder L to be rolled up onto prybars H to then be carried away as illustrated in FIG. 22. All of the foregoing is readily accomplished perforce of the notable leveraging capacity afforded to a person N by the fully assembled frame apparatus so equipped with attachments B and H or B and I and also H. It is the fact of the distance between a person N pushing upwardly or downwardly on attached handlebars B and the fulcrum point on transverse axle 29 divided by the distance to the points on prybars H below a boulder that determines the mechanical advantage ratio that serves to greatly facilitate and simplify the task involving such dislodgment. On the other hand, the fully assembled frame apparatus with wheeling F, i.e. two wheels F affixed thereto along with attachments B, D, E, G, I and J can be used by a person N to easily carry a load such as a load of logs M as shown in FIG. 24. Similarly, by simply replacing attachment B with attachment C, the load of logs M can then be transported to a faraway place by a vehicle O as shown in FIG. 25. In essence, the fully assembled frame apparatus as herein disclosed and claimed serves to expeditiously provide at once for the equivalent of a multiplicity of pieces of loadbearing and leveraging equipment.

In closing, it is, respectfully submitted, with reference to the foregoing recitations that the presently invented fully assembled frame apparatus is not merely new, useful and unique but is, rather instead, indeed virtually revolutionary in the art of manually operable loadbearing and leveraging devices.

What is claimed is:

1. A wheelable loadbearing and leveraging frame apparatus, comprising:
   a. a first elongated member;
   b. said first elongated member being bent outwardly at a first bend through a first angle;
   c. said first elongated member being also bent inwardly at a second bend through a second angle;
   d. said second angle being equal degreewise and oppositely inclined to said first angle;
   e. said first bend being located anterior to a midpoint of said first elongated member;
   f. said second bend being located near a posterior end of said first elongated member;
   g. a first anterior socket in said first elongated member;
   h. a first pair of vertically inclined concentric anterior through holes located in said first elongated member about said first anterior socket;
   i. a first pair of horizontally inclined concentric transverse holes in said first elongated member;
   j. said first pair of transverse holes being located posterior to a locus of said anterior through holes and anterior to a locus of said first bend;
   k. a first pair of vertically inclined concentric medial through holes in said first elongated member;
   l. said medial through holes being located posterior to said locus of said first bend;
   m. a first pair of vertically inclined concentric posteromedial through holes in said first elongated member;
   n. a first duplicate pair of vertically inclined concentric posteromedial through holes located posterior to said first pair of posteromedical through holes in said first elongated member;
   o. a first posterior socket in said first elongated member;
   p. a first pair of vertically inclined concentric posterior through holes located in said first elongated member about said first posterior socket;
   q. a second elongated member being dimensionally equivalent to said first elongated member;

r. said second elongated member being bent outwardly at a first second member bend through a first second member angle;
s. said second elongated member being also bent inwardly at a second, second member bend through a second, second member angle;
t. said second, second member angle being equal degreewise and oppositely inclined to said first second member angle;
u. said first second member bend being located anterior to a midpoint of said second elongated member;
v. said second, second member bend being located near a posterior end of said second elongated member;
w. said first second member angle being equivalent degreewise to said first angle;
x. said second, second member angle being equivalent degreewise to said second angle;
y. a second anterior socket in said second elongated member;
z. a second pair of vertically inclined anterior through holes located in said second elongated member about said second anterior socket;
aa. a second pair of concentric horizontally inclined transverse holes in said second elongated member;
bb. said second pair of transverse holes being located posterior to a locus of said second pair of anterior through holes and anterior to a locus of said first second member bend;
cc. a second pair of vertically inclined concentric medial through holes in said second elongated second member;
dd. said second pair of medial through holes being located posterior to said locus of said first second member bend;
ee. a second pair of vertically inclined concentric posteromedial through holes in said said second elongated member;
ff. a second duplicate pair of vertically inclined concentric posteromedial through holes located posterior to said second pair of posteromedial through holes in said second elongated member;
gg. a second posterior socket in said second elongated member;
hh. a second pair of vertically inclined concentric posterior through holes located in said second elongated member about said second posterior socket;
ii. a rectangularly shaped anterior cross member conjoined at first end edging thereof to an anteriormost portion of medial walling of said first elongated member and at second end edging thereof to an anteriormost portion of medial walling of said second elongated member;
jj. a plurality of collinear horizontally inclined holes in said anterior cross member;
kk. a right angularly formed medial cross member conjoined at a first end edging thereof to said medial walling of said first elongated member posterior to said locus of said first bend and immediately anterior to a locus of said first pair of medial through holes, and; at second end edging thereof to said medial walling of said second elongated member posterior to said locus of said first second member bend and immediately anterior to a locus of said second pair of medial through holes;
ll. a plurality of collinear horizontally inclined medialwise member through holes located in a vertically inclined portion of said medial cross member;
mm. said vertically inclined portion of said cross member being located anteriorly to a horizontally inclined portion thereof when said medial cross member is so conjoined to said elongated members;
nn. a right angularly formed posterior cross member conjoined at a first end edging thereof to said medial walling of said first elongated member such that anterior edging of a horizontally inclined posterior portion thereof lies immediately anterior to a locus of said first pair of posteromedial holes, and conjoined at second end edging thereof to said medial walling of said second elongated member such that said anterior edging of said horizontally inclined portion thereof lies immediately anterior to a locus of said second pair of posteromedial holes;
oo. a plurality of collinear vertically inclined posterior cross member through holes located in said horizontally inclined portion of said posterior cross member, and;
pp. said vertically inclined portion of said posterior cross member being located posterior to said horizontally inclined portion thereof when said posterior cross member is so conjoined to said elongated members.

2. The wheelable loadbearing and leveraging frame apparatus of claim 1, whereby each said pair of transverse holes in receipt of a piece of attached cylindrically shaped elongated sleeving.

3. A wheelable loadbearing and leveraging frame apparatus, comprising:
a. a first elongated member;
b. said first elongated member being bent outwardly at a first bend through a first angle;
c. said first elongated member being also bent inwardly at a second bend through a second angle;
d. said second angle being equal degreewise and oppositely inclined to said first angle;
e. said first bend being located anterior to a midpoint of said first elongated member;
f. said second bend being located near a posterior end of said first elongated member;
g. a first anterior socket in said first elongated member;
h. a first pair of vertically inclined concentric anterior through holes located in said first elongated member about said first anterior socket;
i. a first pair of horizontally inclined concentric transverse holes in said first elongated member;
j. said first pair of transverse holes being located posterior to a locus of said anterior through holes and anterior to a locus of said first bend;
k. a first pair of vertically inclined concentric medial through holes in said first elongated member;
l. said medial through holes being located posterior to said locus of said first bend;
m. a first pair of vertically inclined concentric posteromedial through holes in said first elongated member;
n. a first duplicate pair of vertically inclined concentric posteromedial through holes located posterior to said first pair of posteromedical through holes in said first elongated member;
o. a first posterior socket in said first elongated member;
p. a first pair of vertically inclined concentric posterior through holes located in said first elongated member about said first posterior socket;
q. a second elongated member being dimensionally equivalent to said first elongated member;
r. said second elongated member being bent outwardly at a first second member bend through a first second member angle;
s. said second elongated member being also bent inwardly at a second, second member bend through a second, second member angle;

t. said second, second member angle being equal degreewise and oppositely inclined to said first second member angle;
u. said first second member bend being located anterior to a midpoint of said second elongated member;
v. said second, second member bend being located near a posterior end of said second elongated member;
w. said first second member angle being equivalent degreewise to said first angle;
x. said second, second member angle being equivalent degreewise to said second angle;
y. a second anterior socket in said second elongated member;
z. a second pair of vertically inclined anterior through holes located in said second elongated member about said second anterior socket;
aa. a second pair of concentric horizontally inclined transverse holes in said second elongated member;
bb. said second pair of transverse holes being located posterior to a locus of said second pair of anterior through holes and anterior to a locus of said first second member bend;
cc. a second pair of vertically inclined concentric medial through holes in said second elongated member;
dd. said second pair of medial through holes being located posterior to said locus of said first second member bend;
ee. a second pair of vertically inclined concentric posteromedial through holes in said said second elongated member;
ff. a second duplicate pair of vertically inclined concentric posteromedial through holes located posterior to said second pair of posteromedial through holes in said second elongated member;
gg. a second posterior socket in said second elongated member;
hh. a second pair of vertically inclined concentric posterior through holes located in said second elongated member about said second posterior socket;
ii. a rectangularly shaped anterior cross member conjoined at first end edging thereof to an anteriormost portion of medial walling of said first elongated member and at second end edging thereof to an anteriormost portion of medial walling of said second elongated member;
jj. a plurality of collinear horizontally inclined holes in said anterior cross member;
kk. a right angularly formed medial cross member conjoined at a first end edging thereof to said medial walling of said first elongated member posterior to said locus of said first bend and immediately anterior to a locus of said first pair of medial through holes, and; at second end edging thereof to said medial walling of said second elongated member posterior to said locus of said first second member bend and immediately anterior to a locus of said second pair of medial through holes;
ll. a plurality of collinear horizontally inclined medialwise member through holes located in a vertically inclined portion of said medial cross member;
mm. said vertically inclined portion of said cross member being located anteriorly to a horizontally inclined portion thereof when said medial cross member is so conjoined to said elongated members;
nn. a right angularly formed posterior cross member conjoined at a first end edging thereof to said medial walling of said first elongated member such that anterior edging of a horizontally inclined posterior portion thereof lies immediately anterior to a locus of said first pair of posteromedial holes, and conjoined at second end edging thereof to said medial walling of said second elongated member such that said anterior edging of said horizontally inclined portion thereof lies immediately anterior to a locus of said second pair of posteromedial holes;
oo. a plurality of collinear vertically inclined posterior cross member through holes located in said horizontally inclined portion of said posterior cross member,
pp. said vertically inclined portion of said posterior cross member being located posterior to said horizontally inclined portion thereof when said posterior cross member is so conjoined to said elongated members;
qq. a first rectangularly shaped reinforcing unit with a centerhole being affixed to a topside of an anterior end of said first elongated member such that said centerhole is positioned concentrically with said first pair of vertically inclined concentric anterior through holes;
rr. a second rectangularly shaped reinforcing unit with a centerhole being affixed to a bottom side of said anterior end of said first elongated member such that said centerhole is positioned concentrically with said first pair of vertically inclined concentric anterior through holes;
ss. a third rectangularly shaped reinforcing unit with a centerhole being affixed to a topside of an anterior end of said second elongated member such that said centerhole is positioned concentrically with said second pair of vertically inclined concentric anterior through holes;
tt. a fourth rectangularly shaped reinforcing unit with a centerhole being affixed to a bottom side of said anterior end of said second elongated member such that said centerhole is positioned concentrically with said second pair of vertically inclined concentric anterior through holes;
uu. a first posterior reinforcing unit affixed to a topside of a posterior end of said first elongated member posterior to a locus of a top one of said first pair of vertically inclined posterior through holes;
vv. a second posterior reinforcing unit affixed to a bottom side of said posterior end of said first elongated member posterior to a locus of a bottom one of said first pair of vertically inclined posterior through holes;
ww. a third posterior reinforcing unit affixed to a topside of a posterior end of said first elongated member posterior to a locus of a top one of said second pair of vertically inclined posterior through holes, and;
xx. a fourth posterior reinforcing unit affixed to a bottom side of said posterior end of said second elongated member posterior to a locus of a bottom one of said second pair of vertically inclined posterior through holes.

4. The wheelable loadbearing and leveraging frame apparatus of claim 3, whereby said first and second pairs of transverse holes thereof are each respectively in receipt of a piece of cylindrically shaped elongated sleeving.

5. A wheelable loadbearing and leveraging frame apparatus with attachments, comprising:
a. a first elongated member;
b. said first elongated member being bent outwardly at a first bend through a first angle;
c. said first elongated member being also bent inwardly at a second bend through a second angle;
d. said second angle being equal degreewise and oppositely inclined to said first angle;
e. said first bend being located anterior to a midpoint of said first elongated member;
f. said second bend being located near a posterior end of said first elongated member;
g. a first anterior socket in said first elongated member;

h. a first pair of vertically inclined concentric anterior through holes located in said first elongated member about said first anterior socket;
i. a first pair of horizontally inclined concentric transverse holes in said first elongated member;
j. said first pair of transverse holes being located posterior to a locus of said anterior through holes and anterior to a locus of said first bend;
k. a first pair of vertically inclined concentric medial through holes in said first elongated member;
l. said medial through holes being located posterior to said locus of said first bend;
m. a first pair of vertically inclined concentric posteromedial through holes in said first elongated member;
n. a first duplicate pair of vertically inclined concentric posteromedial through holes located posterior to said first pair of posteromedical through holes in said first elongated member;
o. a first posterior socket in said first elongated member;
p. a first pair of vertically inclined concentric posterior through holes located in said first elongated member about said first posterior socket;
q. a second elongated member being dimensionally equivalent to said first elongated member;
r. said second elongated member being bent outwardly at a first second member bend through a first second member angle;
s. said second elongated member being also bent inwardly at a second, second member bend through a second, second member angle;
t. said second, second member angle being equal degreewise and oppositely inclined to said first second member angle;
u. said first second member bend being located anterior to a midpoint of said second elongated member;
v. said second, second member bend being located near a posterior end of said second elongated member;
w. said first second member angle being equivalent degreewise to said first angle;
x. said second, second member angle being equivalent degreewise to said second angle;
y. a second anterior socket in said second elongated member;
z. a second pair of vertically inclined anterior through holes located in said second elongated member about said second anterior socket;
aa. a second pair of concentric horizontally inclined transverse holes in said second elongated member;
bb. said second pair of transverse holes being located posterior to a locus of said second pair of anterior through holes and anterior to a locus of said first second member bend;
cc. a second pair of vertically inclined concentric medial through holes in said second elongated member;
dd. said second pair of medial through holes being located posterior to said locus of said first second member bend;
ee. a second pair of vertically inclined concentric posteromedial through holes in said said second elongated member;
ff. a second duplicate pair of vertically inclined concentric posteromedial through holes located posterior to said second pair of posteromedial through holes iii said second elongated member;
gg. a second posterior socket in said second elongated member;
hh. a second pair of vertically inclined concentric posterior through holes located in said second elongated member about said second posterior socket;
ii. a rectangularly shaped anterior cross member conjoined at first end edging thereof to an anteriormost portion of medial walling of said first elongated member and at second end edging thereof to an anteriormost portion of medial walling of said second elongated member;
jj. a plurality of collinear horizontally inclined holes in said anterior cross member;
kk. a right angularly formed medial cross member conjoined at a first end edging thereof to said medial walling of said first elongated member posterior to said locus of said first bend and immediately anterior to a locus of said first pair of medial through holes, and; at second end edging thereof to said medial walling of said second elongated member posterior to said locus of said first second member bend and immediately anterior to a locus of said second pair of medial through holes;
ll. a plurality of collinear horizontally inclined medialwise member through holes located in a vertically inclined portion of said medial cross member;
mm. said vertically inclined portion of said cross member being located anteriorly to a horizontally inclined portion thereof when said medial cross member is so conjoined to said elongated members;
nn. a right angularly formed posterior cross member conjoined at a first end edging thereof to said medial walling of said first elongated member such that anterior edging of a horizontally inclined posterior portion thereof lies immediately anterior to a locus of said first pair of posteromedial holes, and conjoined at second end edging thereof to said medial walling of said second elongated member such that said anterior edging of said horizontally inclined portion thereof lies immediately anterior to a locus of said second pair of posteromedial holes;
oo. a plurality of collinear vertically inclined posterior cross member through holes located in said horizontally inclined portion of said posterior cross member;
pp. said vertically inclined portion of said posterior cross member being located posterior to said horizontally inclined portion thereof when said posterior cross member is so conjoined to said elongated members;
qq. an elongated tranverse axle unit;
rr. a first axle through hole located in a first side portion of said transverse axle unit lateral to a midsection of said transverse axle unit;
ss. a second axle unit through hole located in a second side portion of said transverse axle unit lateral to said midsection thereof with said first axle hole and said second axle hole being each equidistant from a midpoint of said midsection thereof;
tt. a first piece of cylindrically shaped elongated sleeving attached within said first pair of transverse holes;
uu. a second piece of cylindrically shaped elongated sleeving attached within said second pair of transverse holes;
vv. said transverse axle unit being receivable through said first piece of sleeving within said first pair of transverse holes and through said second piece of sleeving within said second pair of transverse holes;
ww. a pair of equivalent lockable lynch pin units, and;
xx. said first axle through hole and said second axle through hole each being amenable to receipt of one of said pair of lockable lynch pin units.

* * * * *